(12) United States Patent
Ray et al.

(10) Patent No.: US 10,366,501 B2
(45) Date of Patent: Jul. 30, 2019

(54) METHOD AND APPARATUS FOR PERFORMING BACKGROUND IMAGE REGISTRATION

(71) Applicant: The Boeing Company, Chicago, IL (US)

(72) Inventors: Gary A. Ray, Issaquah, WA (US); Bentley E. Northon, Albuquerque, NC (US)

(73) Assignee: THE BOEING COMPANY, Chicago, IL (US)

( * ) Notice: Subject to any disclaimer, the term of this patent is extended or adjusted under 35 U.S.C. 154(b) by 198 days.

(21) Appl. No.: 15/345,405

(22) Filed: Nov. 7, 2016

(65) Prior Publication Data

US 2018/0130217 A1    May 10, 2018

(51) Int. Cl.
*G06T 3/00*  (2006.01)
*G06T 7/33*  (2017.01)
*G06T 7/37*  (2017.01)
*G06T 5/20*  (2006.01)

(52) U.S. Cl.
CPC ............. *G06T 7/337* (2017.01); *G06T 3/0081* (2013.01); *G06T 3/0093* (2013.01); *G06T 5/20* (2013.01); *G06T 7/37* (2017.01); *G06T 2207/10004* (2013.01)

(58) Field of Classification Search
CPC ............. G06T 2207/10004; G06T 5/20; G06T 3/4007; G06T 7/38; G06T 7/337; G06T 7/37

See application file for complete search history.

(56) References Cited

U.S. PATENT DOCUMENTS

| 8,878,950 B2 * | 11/2014 | Lelescu | ................. G06T 3/4076 348/218.1 |
| 2003/0091226 A1 * | 5/2003 | Cahill | ................ G06K 9/00201 382/154 |
| 2003/0128280 A1 * | 7/2003 | Perlmutter | ............... G06K 9/32 348/222.1 |

(Continued)

OTHER PUBLICATIONS

Bartoli, Guido, "Image Registration Techniques: A Comprehensive Survey", Visual Information Processing and Protection Group, Jun. 2007.

(Continued)

*Primary Examiner* — Shaghayegh Azima
(74) *Attorney, Agent, or Firm* — Gates & Cooper LLP

(57) ABSTRACT

A method and apparatus for registering a first image having a first plurality of pixel values from a sensor having a plurality of pixels and a second image having a second plurality of pixel values of the plurality of pixels is disclosed. The method includes selecting a first image having a first plurality of pixel values and a second image having a second plurality of pixel values, grouping the first plurality of pixels according to a grid having a plurality of grid elements, each grid element having a plurality of pixels, determining a grid element displacement of the second image from the first image for each grid element of pixels, filtering the displacement of the second image from the first image to produce filtered valid grid element displacements and invalid grid element displacements, and determining a warping transform of each of the grid element displacements.

20 Claims, 19 Drawing Sheets

(56) References Cited

U.S. PATENT DOCUMENTS

| | | | | |
|---|---|---|---|---|
| 2007/0250274 A1* | 10/2007 | Volkov | ............... | C12Q 1/6813 |
| | | | | 702/22 |
| 2009/0046951 A1* | 2/2009 | Paragios | ............... | G06K 9/32 |
| | | | | 382/294 |
| 2011/0044531 A1* | 2/2011 | Zhang | ............... | G06T 5/50 |
| | | | | 382/154 |
| 2012/0027288 A1* | 2/2012 | Yuan | ............... | G06K 9/6211 |
| | | | | 382/152 |
| 2013/0028519 A1* | 1/2013 | Zuniga | ............... | G06K 9/4671 |
| | | | | 382/195 |
| 2013/0094781 A1* | 4/2013 | Koga | ............... | G06T 3/4053 |
| | | | | 382/300 |
| 2014/0307931 A1* | 10/2014 | Gierahn | ............... | G06T 7/11 |
| | | | | 382/128 |
| 2016/0028967 A1* | 1/2016 | Sezer | ............... | H04N 5/2628 |
| | | | | 348/240.2 |
| 2016/0267349 A1* | 9/2016 | Shoaib | ............... | G06T 5/50 |
| 2017/0024846 A1* | 1/2017 | Nash | ............... | G06F 3/04842 |
| 2017/0328716 A1* | 11/2017 | Ma | ............... | G01C 21/165 |

OTHER PUBLICATIONS

Brown, L. G., "A survey of image registration techniques", ACM Computing Surveys, vol. 24, No. 4, pp. 325-376, Dec. 1992.
Zitova, B., et al., "Image registration methods: a survey", Image and Vision Computing 21, pp. 977-1000, 2003.

\* cited by examiner

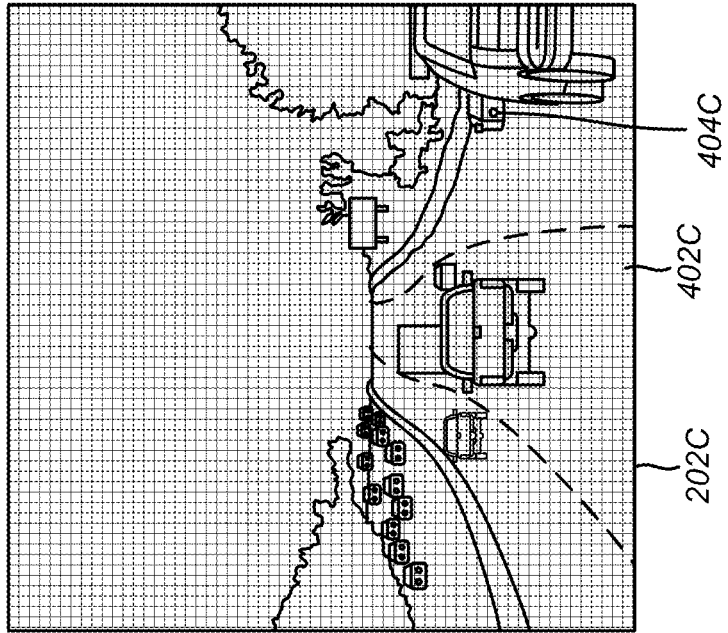
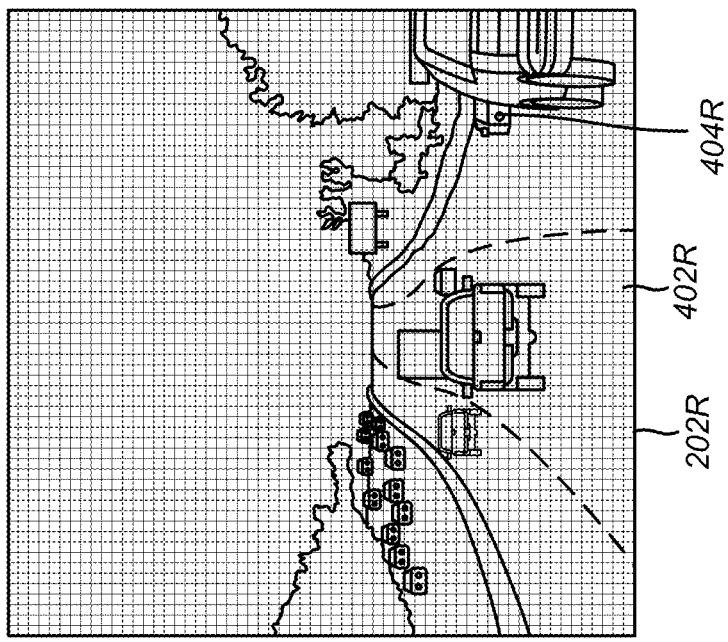
FIG. 4A
FIG. 4B

METHOD AND APPARATUS FOR PERFORMING BACKGROUND IMAGE REGISTRATION

BACKGROUND

1. Field

The present disclosure relates to systems and methods for processing images, and in particular to a system and method for performing background image registration.

2. Description of the Related Art

Image registration is the process of overlaying two or more images of the same scene taken at different times, from different viewpoints, and/or by different sensors. It geometrically aligns two images—the reference and sensed images. This alignment should be done with respect to the background, ignoring objects, features and regions with differing relative movement. The present differences between images are introduced due to different imaging conditions. Image registration is a crucial step in all image analysis tasks in which the final information is gained from the combination of various data sources like in image fusion, change detection, and multi-channel image restoration. Typically, registration is required in remote sensing (multispectral classification, environmental monitoring, change detection, image mosaicking, weather forecasting, creating super-resolution images, integrating information into geographic information systems) and in other areas such as cartography (map updating) and computer vision for manufacturing, security and many other areas.

Images and videos of nearly featureless domains such as sky, desert, fog, clouds and oceans have many challenging aspects that other types of images do not share. One is the very low image feature to noise ratio (IFNR). This can be for many different reasons. For example, when the camera is pointing at the sky (whether optical or IR), there are very few structures visible and those present often have only a small contrast (or temperature difference) compared to the sky background. Even in the case of bright white clouds against a blue background (where there is good contrast), it is difficult to determine a precise point associated with such a diffuse object in two frames. Also, even when parts of the ground are visible with high contrast objects, its alignment information is often not enough to overcome the misinformation caused by the poor contrast and misleading image displacement estimates in the rest of the image. More common is that the ground portion of the image also has few and poor contrasting objects, especially for natural scenes, desert, or during poor visibility such as fog.

What is needed is a system and method for aligning such difficult images, including both electro-optic (EO) and infrared (IR) sensor types. Such a system and method is described below.

SUMMARY

To address the requirements described above, this document discloses a system and method for registering a first image having a first plurality of pixel values from an image sensor having a plurality of pixels and a second image having a second plurality of pixel values of the plurality of pixels. In one embodiment, the method comprises selecting a first image having a first plurality of pixel values and a second image having a second plurality of pixel values from an image sensor and spatially corresponding to the first image, grouping the first plurality of pixels according to a grid having a plurality of grid elements, each grid element having a plurality of pixels, determining a grid element displacement of the second image from the first image for each grid element of pixels, filtering the displacement of the second image from the first image to produce filtered valid grid element displacements and invalid grid element displacements, and determining a warping transform of each of the grid element displacements. In one embodiment, the warping transform is determined by grouping the grid element displacements into overgrids, determining a warping transform for each overgrid having a threshold number of valid grid element displacements, and determining a warping transform for each overgrid not having a threshold number of valid grid element displacements from the warping transform of neighboring overgrids having the threshold number of valid grid element displacements. Another embodiment is evidenced by an apparatus having a processor and communicatively coupled memory storing instructions for performing the foregoing operations. Still another embodiment is evidenced by a vehicle guidance system having a registration unit as described above.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout:

FIGS. 4A-4B are diagrams presenting a first and second image with grid elements;

DESCRIPTION

Figure 1:
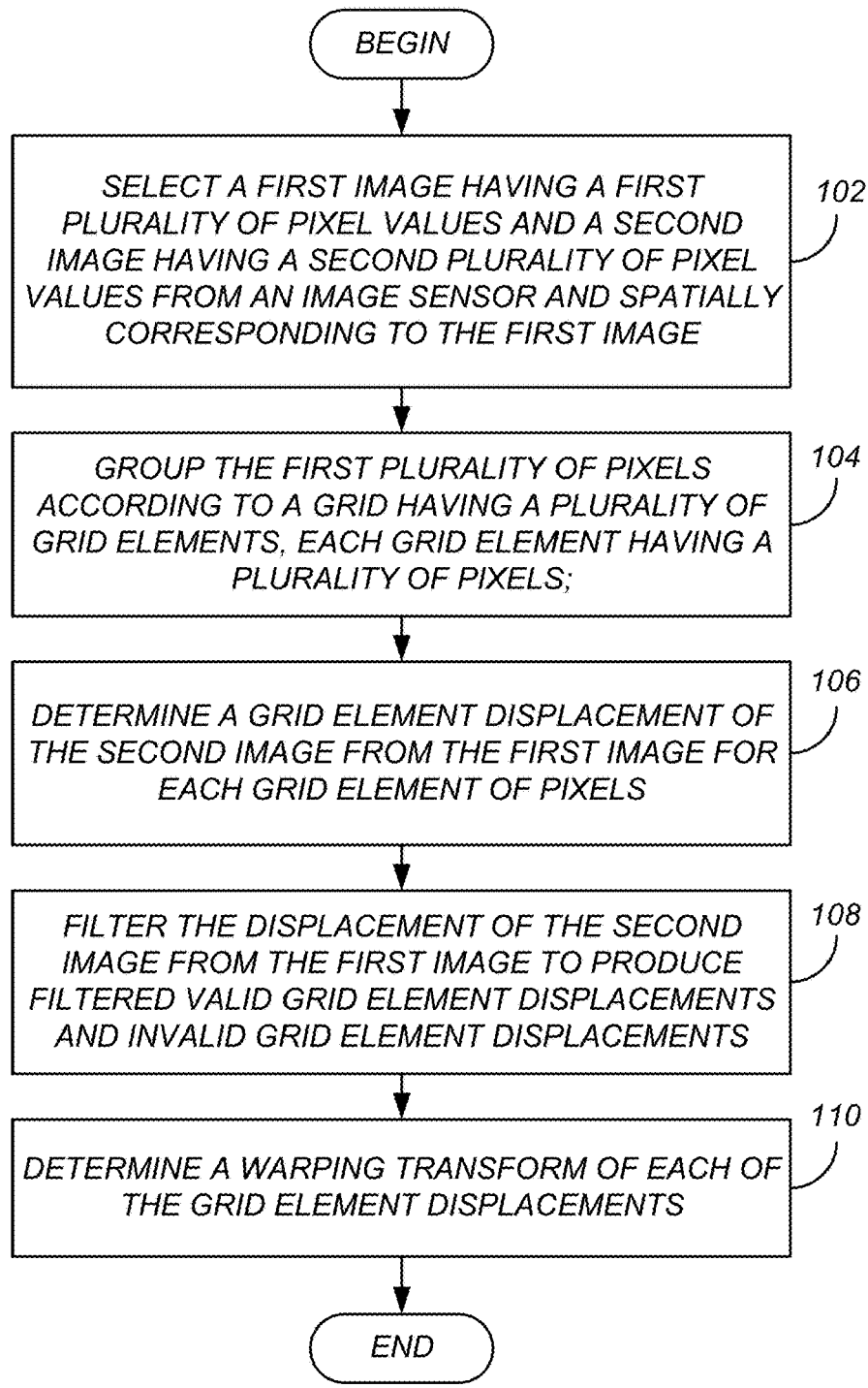
FIG. 1 is a diagram depicting exemplary operations that may be used to register images.

In the following description, reference is made to the accompanying drawings which form a part hereof, and which is shown, by way of illustration, several embodiments. It is understood that other embodiments may be utilized and structural changes may be made without departing from the scope of the present disclosure.

Overview

This invention provides a novel means of aligning difficult near-featureless images, including both electro-optic (EO) and infrared (IR) sensor types. These methods are based on methodologies not present in existing image registration algorithms, and include a two level gridding system which uses two dimensional sum of differences metric in the finest grid and a robust method to discard inaccurate displacement estimates in the coarser overgrid. This method provides:

1. Grids or windows of size sufficient to overcome the deficiencies in the IFNR;
2. Overgrids with $l_1$ fitting to a complex warping surface which ignores bad estimates; and
3. Several non-linear filters which provide an order-independent filling method to replace missing or corrupted image displacement data.

Together, these features overcome the difficulties inherent in matching such near-featureless imaging for the purposes of tracking, background subtraction and sensor fusion as well as many other applications. This allows for image registration of challenging image types (including airborne applications) where there are very few features with very low contrast. In turn, this allows better moving object detection and background subtraction, multi-spectral classification, environmental monitoring, change detection, image mosaicking, weather forecasting, creating super-resolution images, integrating information into geographic information systems and in other areas such as cartography (map updating) and computer vision for manufacturing, and security.

Other solutions attempt to estimate the image transformation from one frame to another frame and attempt to detect features of different types through contrast, object detection and segmentation, or through image cross correlation. These existing methods either have very low performance with low IFNR images or do not allow flexibility in the types of warping transformations. Such methods also do not support the elimination of invalid data while keeping valid data because they do not simultaneously balance improved IFNR performance against other factors.

Image Registration

The primary steps needed to register a set of digital images include:

1. Preprocessing the image to perform smoothing, deblurring, edge detection, or segmentation. This step is largely tied to the sensor and image formation and will not be further addressed in this disclosure.
2. Feature detection, including extracting points, lines, regions, templates, etc. in both images;
3. Feature matching, which must be robust to mismatches and avoid outliers;
4. Transformation estimation, which creates the apparent image deformation from current image to reference image; and
5. Resampling, which uses the transformation to warp the current image to the reference image.

Some general considerations of methods used to perform image registration method are as follows. First, the features should be distinctive objects which are ideally uniformly spread over the images. Also, they should be easily detectable and the detected feature sets in the reference and current images must have enough common elements that registration is possible. The detection method should have good localization accuracy and should not be sensitive to the mechanism of image degradation.

Second, the algorithm should be able to make correct feature matches between the reference and current image frame, since corresponding features can be dissimilar due to the different imaging conditions, shadowing, orientation and/or sensor spectral sensitivity. The feature matching algorithm should be robust so as not to be influenced by slight feature variations. Also, features without corresponding counterparts in the other image should not degrade its performance.

Third, the type of mapping functions should be chosen according to the a-priori known information about the acquisition process and image characteristics. The accuracy of the feature detection method, the reliability of feature correspondence estimation, and the acceptable approximation error also need to be considered as part of this mapping choice.

Fourth, the choice of the appropriate type of resampling technique depends on a trade-off between the accuracy of the interpolation and the computational complexity. Often using nearest-neighbor or bilinear interpolation are sufficient, but some applications require more precise methods.

Feature Detection

Feature detection falls in two broad categories, area-based methods and feature-based methods. Area-based methods put emphasis on the feature matching step rather than their detection, so we cover these methods in the next section. There are 3 types of feature-based methods, defined by their dimensionality:

Region features—These types of features are usually projections of general high-contrast closed-boundary regions of appropriate size and are represented by their center of gravity which is invariant with respect to rotation, scaling, skewing, random noise and gray level variation. Regions are often large land features such as water reservoirs, lakes, buildings, forests, urban areas, object shadows, etc. and are usually identified by a segmentation procedure.

Line features—These features are often used in airborne and satellite image registration, because they are well suited to identify object contours like artificial structures or geological elements, coastal lines, roads, etc. Standard edge detection methods like Canny, Harris or the Laplacian are often used for these purposes.

Point features—Features based on points are the most commonly used features for image registration since they can provide a highly parametric description of the correspondence based only on point coordinates. Features like this include line intersections, road crossings, high variance corners, local curvature discontinuities, curve inflection points, etc. Most algorithms used for point detection rely on the idea of a "corner" or interest point which has high contrast change in both directions.

These types of features share basic problems when the images have low contrasting objects or high noise since choosing features in two different images would likely not be the same feature or would be the same feature, but not at the same location. Thus these basic problems can destroy the ability to accurately register two images.

Feature Matching

The detected features in the reference and sensed images can be matched by means of the image intensity values in their close neighborhoods, the feature spatial distribution, or the feature symbolic description. Some methods, while looking for the feature correspondence, simultaneously estimate the parameters of mapping functions and thus merge the second and third registration steps. In the following paragraphs, the two major categories (area-based and feature-based methods, respectively) are described and further classified into subcategories according to the basic ideas of the matching methods.

Area-Based Methods of Feature Matching

Area-based methods typically use correlation-like methods or template matching and merge the feature detection step with the matching step. These methods deal with the images without attempting to detect objects. Grids or windows of predefined size or even entire images are used when correlating or template matching. Area-based methods are most suitable for the registration of images which locally differ only by a translation and are less suitable for more complex transformations. They have a distinct advantage when high contrast features are not present in the image since correlation is an optimal way to find the best matched translation and can operate with extremely low IFNR and extremely low contrast differences within each correlation grid or window. Of course correlation within a smooth area without any details will likely be matched incorrectly with other smooth areas in the reference image and this can cause large grid motion error.

Cross-Correlation methods: Classical area-based methods like cross-correlation exploit for matching the geometric pattern of image intensities without any structural analysis. Consequently, they are sensitive to shadowing and different sensor types, but they do give much performance gain against random noise. The correlation can be normalized, the maximum found and this metric can be computed within each window (or grid) from the sensed and reference images. These window or grid pairs are then associated to create a "feature" match that corresponds to a particular row and column pixel displacement, depending on where the cross-correlation is maximized. Also, if the subpixel accuracy is demanded, the cross-correlation peak can be interpolated. Cross-correlation can exactly align translated image grids, but can also be used for slight rotation and scaling. Note that cross-correlation is more computationally intensive than other feature-based methods. Also, note that computing the minimum of the sum of the squared differences over all translations is a nearly equivalent computation to cross-correlation and both can be computed with roughly (2n log(n)+n)2 multiplications using the Fast Fourier Transform (FFT), but other alternatives do even better. Table x below shows the number of multiplications and additions for different sizes of cross-correlation.

Fourier methods: Fourier methods are essentially equivalent to cross-correlation in the time domain, except they are more efficient. They exploit the Fourier representation of the images in the frequency domain. The phase correlation method is based on the Fourier Shift Theorem and was originally proposed for the registration of translated images. It computes the cross-power spectrum of the sensed and reference images and looks for the location of the peak in its inverse.

Mutual information methods: Mutual information methods represent the leading technique in multimodal registration. Registration of multimodal images is a difficult task and remote sensing often makes use of it when using multiple sensor types which must be fused together. Mutual information is a measure of statistical dependency between two data sets and it is particularly suitable for registration of images from different modalities. Mutual information between two random variables X and Y is given by:

$$MI(X,Y)=H(Y)-H(Y|X)=H(X)+H(Y)-H(X,Y)$$

where $H(X)=-EX(\log(P(X))$ represents the entropy of a random variable and $P(X)$ is the probability distribution of X. Image registration is based on the maximization of MI. Often times this process can be speeded up by exploiting a coarse-to-fine resolution strategy (also called the pyramidal approach). Mutual information methods tend to not be very precise when registering images of the same modality.

Optimization methods: Optimization methods are used to find the minimum of a metric that measures the displacement of one image to another. The only sure method yielding a global optimal solution requires an exhaustive search over the entire image. It is very computationally demanding, but can only be used practically if the presumed warping function is very simple. In case of transformations with more degrees of freedom or in case of more complex similarity measures, very sophisticated optimization algorithms are required which can ignore local minima and instead can find the global minimum. Furthermore, when the image requires a segmented warping function, this is totally impractical.

Feature-Based Methods of Feature Matching

Feature-based matching assumes that two sets of features in the reference and sensed images have been detected. The aim is to find the pairwise correspondence between them using their spatial relations or various descriptors of features. This also involves some means of measuring and rejecting some of the pairwise associations due to poor matching. Once the matching has occurred, a transformation can be estimated for the images.

Transformation Estimation

After the feature correspondence has been established the mapping or warping function is constructed. It should transform the sensed image to overlay it over the reference one. The type of warping function should correspond to the assumed geometric deformation of the sensed image, to the method of image acquisition and to the required accuracy of the registration. Models of warping functions can be divided into two broad categories: global models and local models. Global models use all feature matches for estimating one warping function for the entire image. Local models treat the image as a composition of patches and the function parameters depend on data in each patch. This leads to a set of warping functions for each patch separately.

Improved Image Registration

Image sources such as video cameras generate successive image frames. Each image frame comprises a plurality of pixels, each having a pixel value. Pixels are the smallest element of the image, and each pixel corresponds to any one value for the relevant parameter. In an 8-bit gray scale image, the value of the pixel between 0 and 255, with the value of a pixel at any point correspond to the intensity of the light photons striking at that point, with each pixel store a value proportional to the light intensity at that particular location. Pixels values may also represent other image parameters such as hue or saturation. A sequence of video image includes image of different objects, all moving at different rates. The video image typically also includes a background image, which also appears to move because of motion of the source of the video (e.g. video camera). Background registration refers to the process by which this background image is identified and correlated. Once the background has been registered an image may be compared to a previous image to identify differences. Such differences between succeeding images represent motion of the objects in the image, and not the relative motion (lateral or angular) of the video source.

Image registration at its most basic form takes two image frames, the reference frame and the current frame and computes an image transformation that maps the current frame into the reference frame so that the two frames are nearly in pixel alignment. Thus this transformation (or warp) is an estimate of the change between the new scene and the original scene. This warp can then be used in many different ways in applications, including as an estimate of the change in the camera pointing angle, the velocity of the fixed camera on a moving platform, for fusion of images from different sensors, or as a means to do background subtraction between two images to enhance a moving target.

FIG. 1 is a diagram depicting exemplary operations that may be used to register a first image and a second image. The first image has a first plurality of pixel values from an image sensor having a plurality of pixels. Further, the second image likewise has a second plurality of pixel values of the plurality of pixels of the first image. In different embodiments the second image is temporally subsequent from the first image, reflects a different perspective at the same moment in time, is obtained using a different sensor or sensor type, or any combination thereof.

Figure 2B:
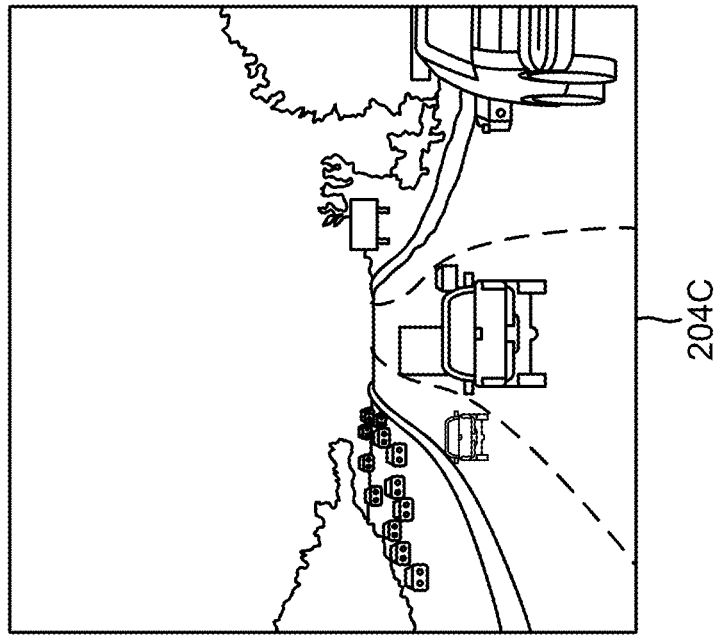
FIGS. 2A-2B are diagrams depicting two temporally successive images.
Figure 2A:
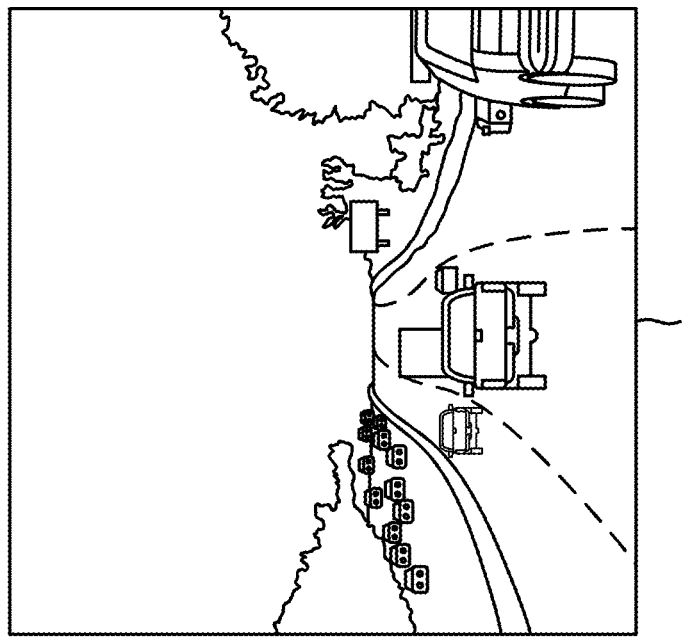

FIG. 2 is a diagram depicting two exemplary temporally successive images, including a first image 202R (or reference frame) and a second image 202C (or current frame).

Referring to FIG. 1, block 102 selects a first image 202R including a first plurality of pixels having an associated plurality of pixel values, and a second image 202C having a second plurality of pixels having associated pixel values. The second image 202C, in this example, spatially corresponds to the first image 202R, although it may reflect the image from a different perspective. Hereinafter, the first image 202R and second image 202C are alternately referred to as the reference frame 202R and current frame 202C under consideration (e.g. the frame to be registered to the reference frame), respectively.

Before the image registration process can commence, the selected images 202 are corrected for known defects. These corrections include corrections for pixel value non-linearities, lens distortions, or pixel color corrections, among many types of non-linear corrections. These are specific to the type of focal plane array and lens system and are typical of sensor image processing.

Figure 3:
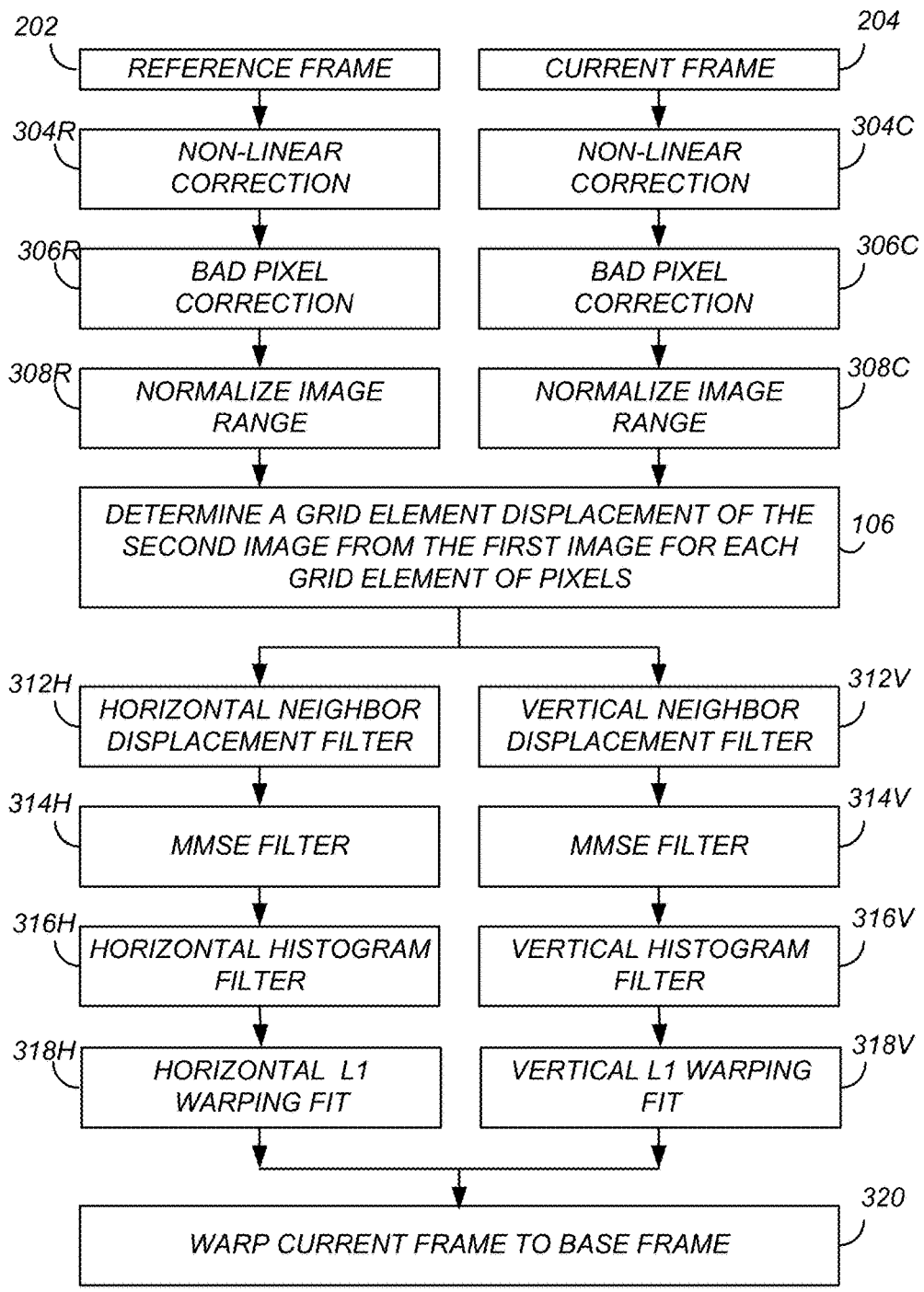
FIG. 3 is a diagram further illustrating the registration process.

FIG. 3 is a diagram further illustrating the registration process. Blocks 304R-308R and 304C-308C represent image correction operations performed on the first (reference) image 202R and the second (current) image 202C.

Pixel values may not linearly represent the value measured by the pixel sensor. For example, each pixel of the image sensor may provide an output value that is not a linear multiple of the brightness of the object that is sensed. Blocks 304R and 304C provide a correction for such non-linearities (e.g. by applying a gain to the measured pixel values to linearize them) for the first image 202R and the second image 202C, respectively.

Many image sensors have at least some defective pixels (such pixels typically present a pixel value associated with either black or white regardless of the image), thus most image sensors produce images with bad pixels. Blocks 306R and 306C provide a correction for such bad pixels, typically by replacing bad values with a suitable pixel value average around the bad pixel. In blocks 308R-308C. Finally, the pixel values of each image are normalized for further processing so that both frames are comparable in dynamic range. This is performed in blocks 308R and 308C.

Returning to FIG. 1, block 104 groups the first plurality of pixels (of first image 202R) according to a grid having a plurality of grid elements such that each grid element comprises a plurality of pixels.

FIGS. 4A and 4B are diagrams illustrating the first image 202R pixels grouped according to a grid 402R having a plurality of grid elements such as grid element 404R. A similar grouping is shown for the pixels of the second image 202C, including grid 402C and grid element 404C, which corresponds to (e.g. the values of that grid element were measured using the same sensor elements as grid element 406R, but later in time or from a different location) grid element 406R in the reference frame. Note the image of a light source has moved from a position in the first image 202R within grid element 404R to a position downward and to the left in the second image 202C, but remains within the corresponding grid element 404C.

Returning to FIG. 1, block 106 determines a grid element 406 displacement of the second image 204 from the first image 202 for each grid element 406 of the grid of pixels.

Figure 5:
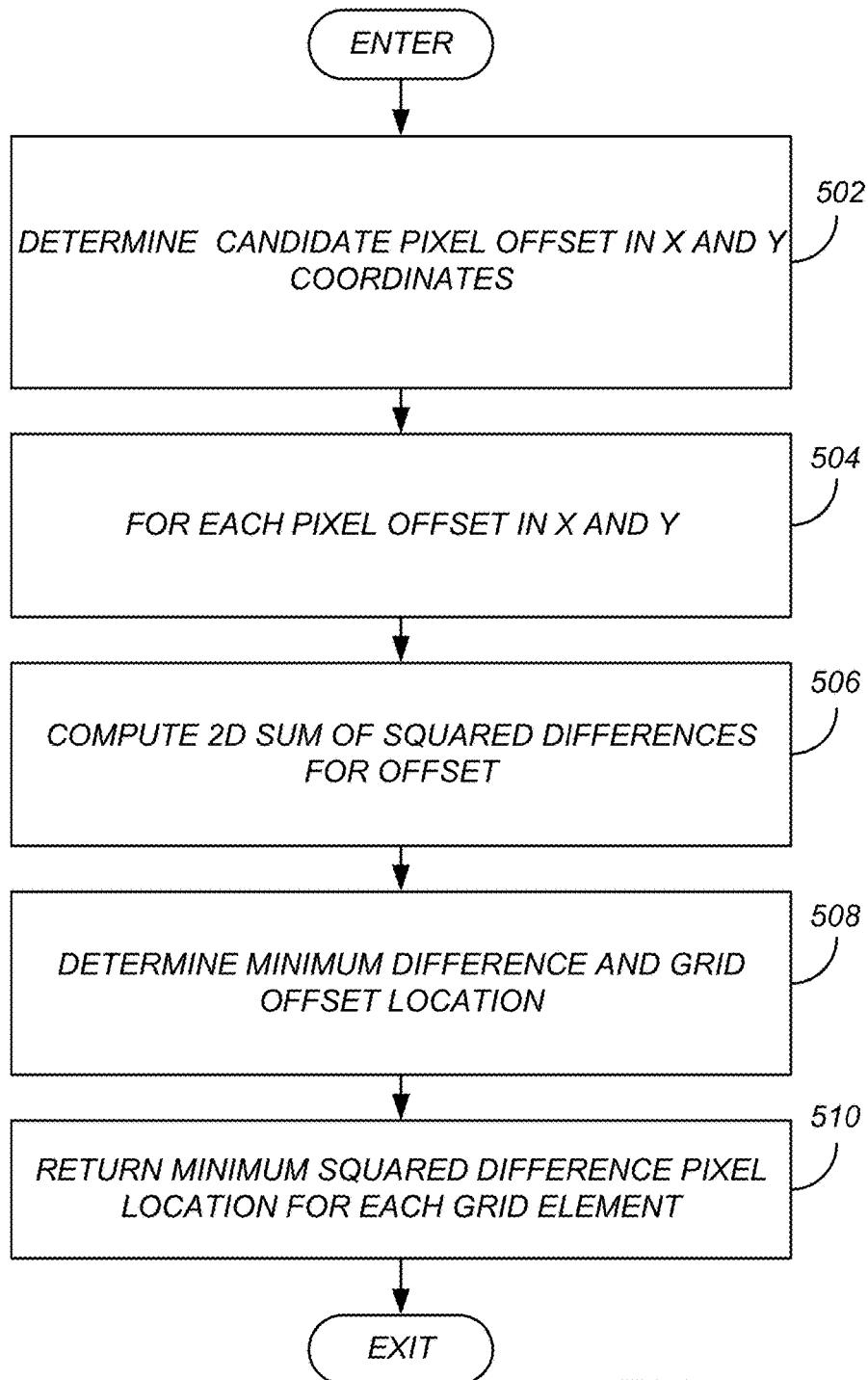
FIG. 5 is a diagram illustrating a technique for computing the displacement of the second image from the first image.

FIG. 5 is a diagram illustrating a technique for computing the displacement of the second image 202C from the first image 202R. In block 502 candidate pixel offsets are identified. In blocks 504-506, pixels in the grid element of the reference image 202R are shifted relative to the pixels of the grid element of the current image 202C by those candidate pixel offsets, and a squared difference between the pixel values of the shifted reference image 202R and the current image 202C are computed. In blocks 508-510, the pixel offset resulting in the minimum squared difference is determined, and returned to as the grid element 406 displacement. This process is repeated for each grid element 406

Figure 6A:
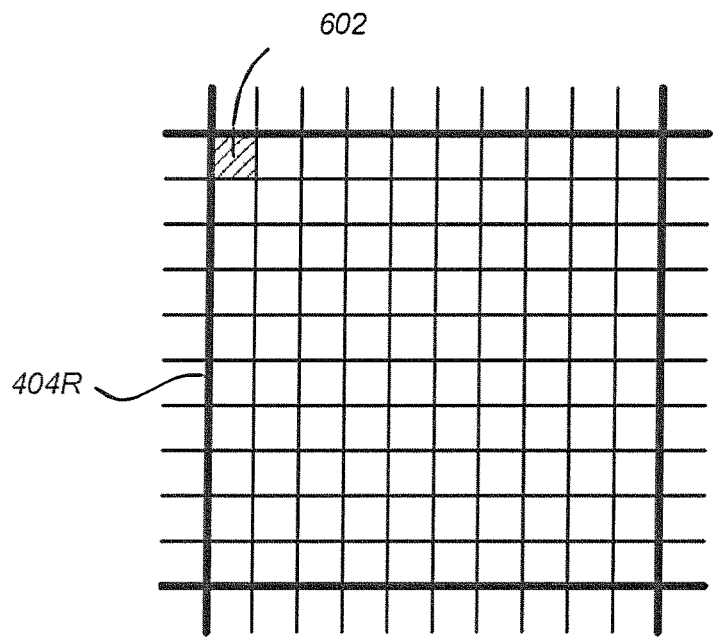
FIGS. 6A and 6B are diagrams illustrating the computation of pixel offsets within grid elements.
Figure 6B:
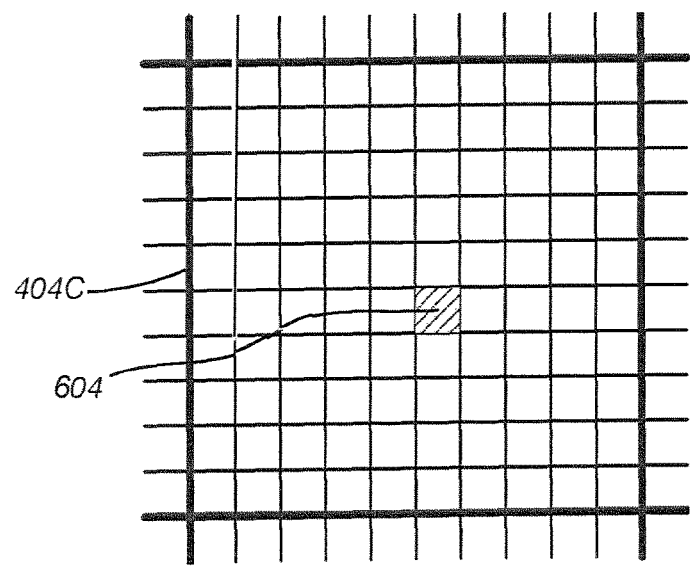

FIGS. 6A and 6B are diagrams illustrating the computation of pixel offsets within grid elements 404. In the illustrated embodiment, the feature or sub-image is the light or bright spot illustrated in FIGS. 4A and 4B. FIG. 6A illustrates grid element 404R shown in FIG. 4A, with the sub image of the light source indicated by shaded pixel location 602. In this reference frame 202R, the sub-image lands near the border of the grid element 404R in the indicated location, but in the subsequent (current) frame 202C illustrated in FIG. 6B, it lands near the center of grid element 404C, at shaded pixel location 604 displaced by 5 pixels to the right and by five pixels down (5, −5). In one embodiment, this is accomplished by a minimizing the least squared difference between pixel values of the reference image 202R and current image 202C, as the current image 202C is offset in the x and y direction.

With reference to FIG. 5, block 502 begins by determining candidate pixel offsets. In this example, block 502 identifies pixel offsets of −10 to +10 pixels in the x (left and right) direction and −10 to +10 pixels in they (up and down)

direction. Block 504 selects one of such candidate pixel offsets, for example a candidate offset of one pixel in the x direction, and zero pixels in the y direction. Blocks 506 offsets the reference image 202R to the right by one pixel from its original location and compares this offset reference image 202R to the current image 202C and computes differences in pixel values between the current image 202C and the offset reference image 202R, as well as sum of the squares of these differences for each pixel. Block 504 repeats this process for each of the candidate pixel offsets in x and y. After a sum of squared differences for pixel values has been determined for every candidate pixel offset, the minimum difference is determined as shown in block 508, and the pixel offset that resulted in this minimum distance is selected as the pixel offset of the grid element between the reference image 202R and the current image 202C, as shown in block 510. In the example illustrated in FIGS. 6A and 6B, the minimum difference occurred with the pixel offset in the +5, −5 direction, since the light source in the reference image 202R moved 5 pixels in the x direction and −5 pixels in the y direction.

Referring again to FIG. 1, at block 108, once the displacement estimates have been compiled for each grid element 406 in the image pair (the reference image 202R and the current image 202C), the computed displacement estimates are filtered to produce filtered valid grid element displacements and invalid grid element displacements. This is accomplished by locally filtering each horizontal and vertical frame to eliminate inaccurate or invalid displacement values. In one embodiment, this is performed as described in blocks 312H-318H and 312V-318V of FIG. 3.

Turning to FIG. 3, the horizontal and vertical displacement estimates are neighbor displacement filtered, as shown in blocks 312H and 312V, respectively. Neighbor displacement filtering includes for example, mode-P displacement filtering and neighbor boundary interpolation. Given a displacement frame in the x or y direction, mode P filtering is used to eliminate errant displacement values (these are assumed to be integer displacements for the following processing steps) in each pixel neighborhood. Typically, a pixel neighborhood consists of the present pixel and its 8 neighbors in each direction, but could be a larger neighborhood if desired and could consist of more than two dimensions for other types of imaging data. The basic algorithm goes through each displacement value and if the largest number of neighbor values that are the same (for example equal to Q) is greater than or equal to P, the current displacement value is replaced by Q. Note that the mode of a set is the most frequently occurring value, hence the name of this filter. For a 2D 8 neighbor case, P=5 is reasonable since it covers all cases where the present pixel is either inside or on a displacement "boundary", i.e. where the displacement changes values by at least 1.

Figure 7:
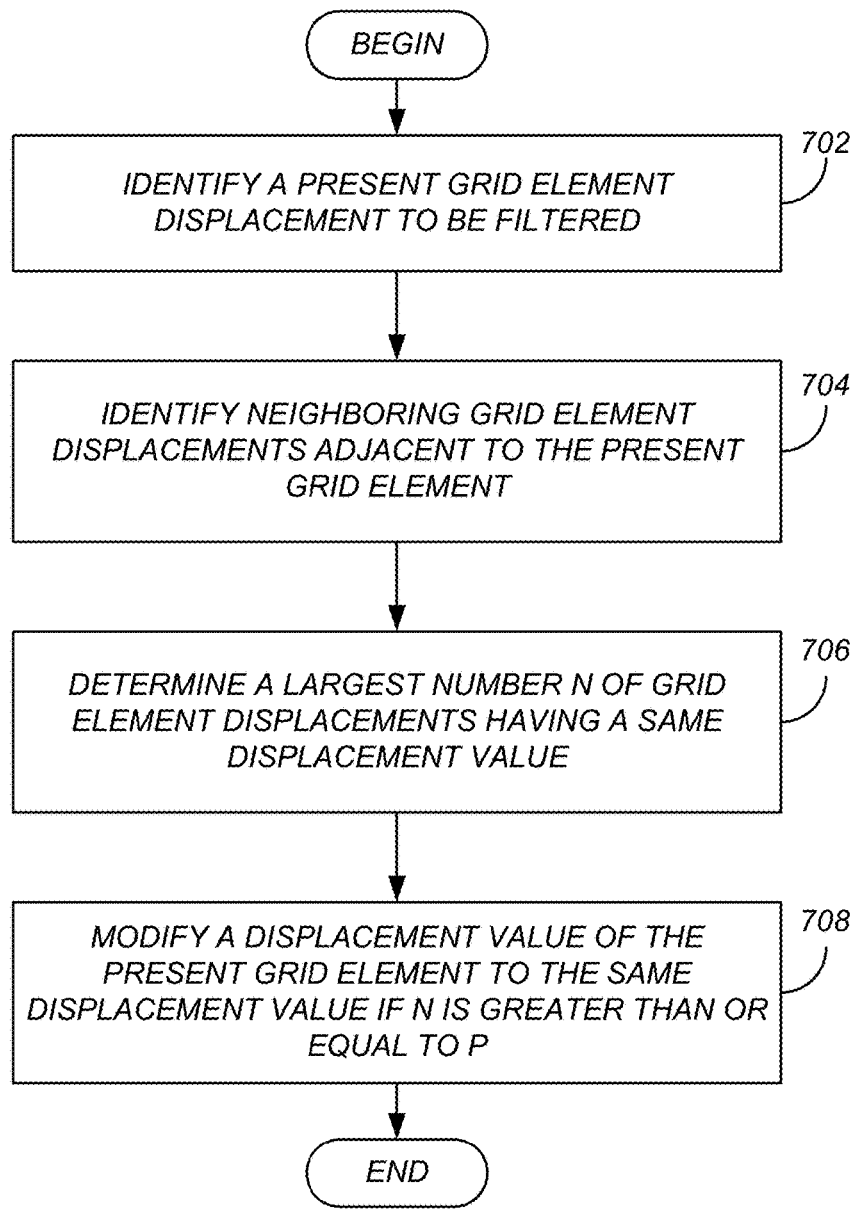
FIG. 7 is a diagram presenting illustrative operations that can be used to perform mode-P displacement filtering.
Figure 8:
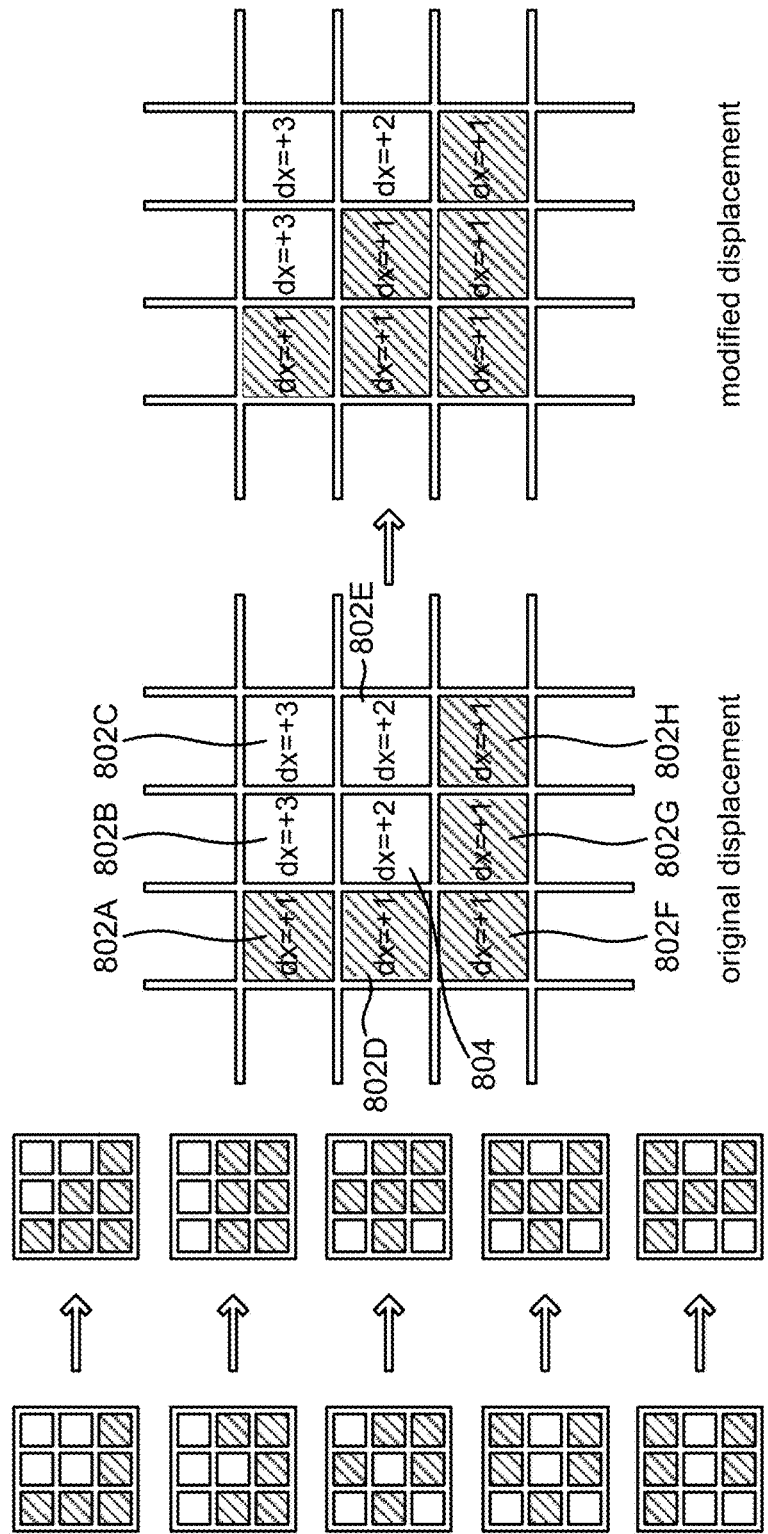
FIG. 8 is a diagram presenting an illustrative application of mode-P filtering; n the end values, replace the middle value with the mean of the end values.

FIG. 7 is a diagram presenting illustrative operations that can be used to perform mode-P displacement filtering, and FIG. 8 is a diagram presenting an illustrative application of such operations. In block 702, a present grid element displacement that is to be filtered is identified, for example, grid element 804. Next, block 704 identifies neighboring gird element displacements adjacent to the present grid elements. For example, grid elements 802A-802H are identified as adjacent present grid element 804. Next, a largest number N of grid element displacements having the same displacement value are identified, as shown in block 706, and the displacement value of the present grid element 804 is modified to the same displacement value if N is greater than or equal to P, as shown in block 708. Turning to the example of FIG. 8, the largest number of grid element displacements having the same displacement value is five, because there are five displacement values of +1, two displacement values of +2 and two displacement values of +3. If mode-5 filtering is desired, if there are at least 5 adjacent grid elements having the same displacement value, the displacement value assigned to the present grid element 804 is that of the 5 adjacent elements. In the example of FIG. 8, adjacent grid elements 802A, 802D, 802E, 802F, 802G, and 802H all have a displacement value of +1, and since this is a mode-5 filter, the value of the present element 804 is set to +1 as well, as shown in the modified displacement.

FIG. 8 also shows mode-5 filtering for other displacement arrangements in which at least 5 grid elements adjacent the present (center) grid element have the same value. In each case, the present (center) grid element is modified to have the same value as those adjacent elements.

FIG. 8 illustrates an example of mode-P filtering where P=5. However, other the grid elements may be filtered using other mode filtering schemes as well. For example, mode-13 filtering may be used in a case where the present pixel is a center pixel of a 5×5 array of pixels, and if the value of at least 13 of the pixels in the 5×5 array have the same value, the value of the center pixel replaced if the value of those 13 pixels.

The next processing step is to interpolate the neighbor displacements, that is for each of 4 sets of three displacements on each side of the present displacement, if the middle displacement value is between the end values, replace the middle value with the mean of the end values.

Figure 9:
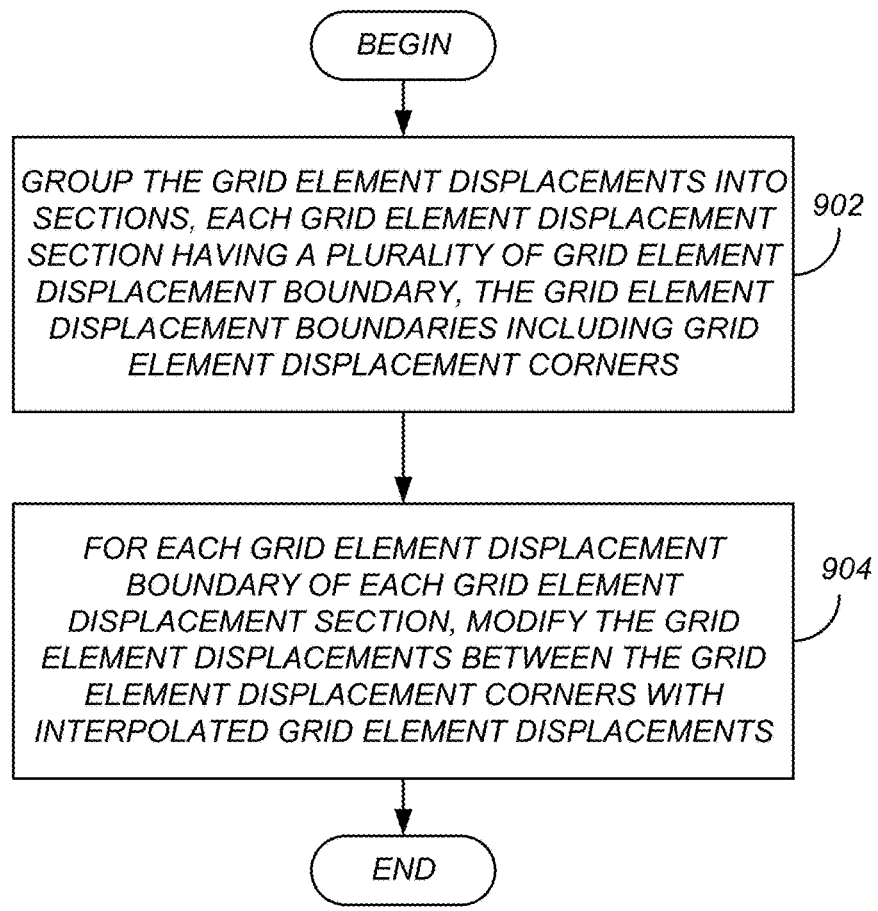
FIG. 9 is a diagram illustrating illustrative operations that can be used to perform neighborhood boundary interpolation filtering.
Figure 10:
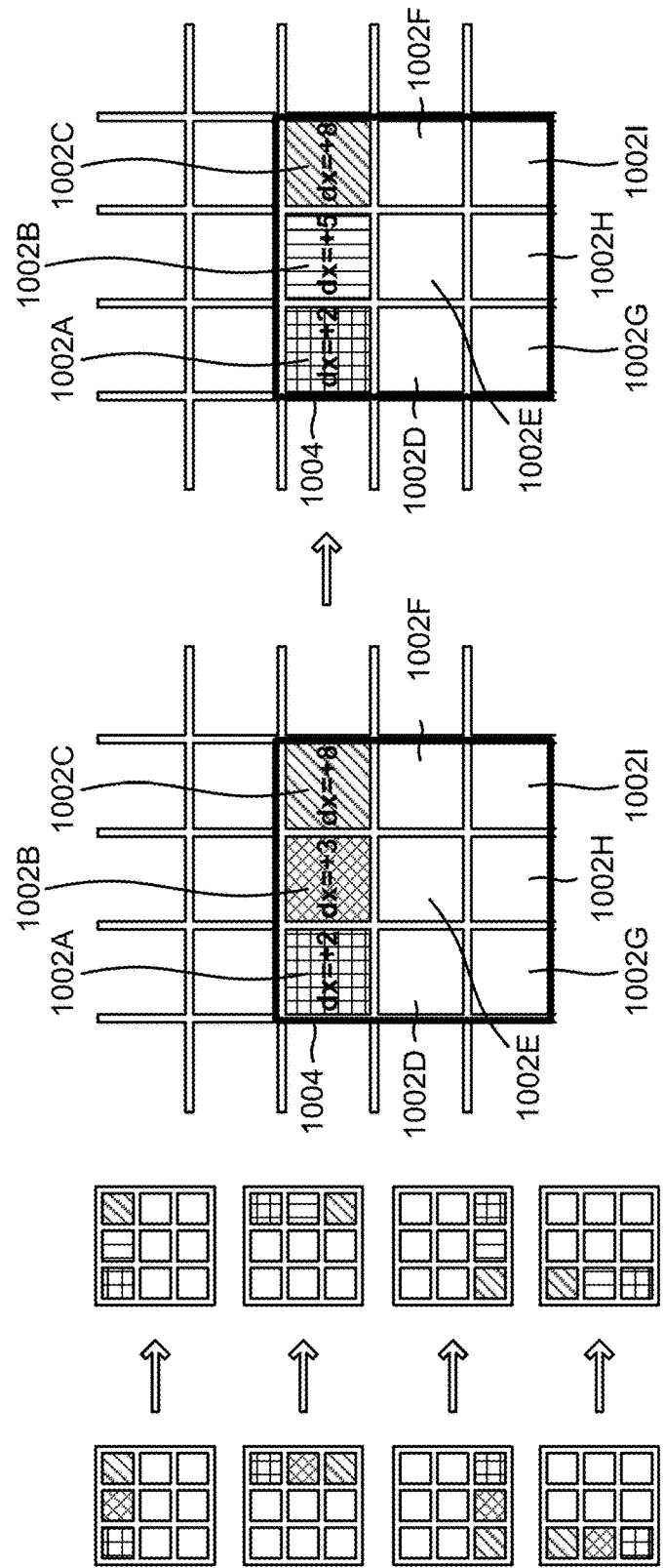
FIG. 10 is a diagram presenting an illustrative application neighborhood boundary interpolation filtering.

FIG. 9 is a diagram illustrating illustrative operations that can be used to perform neighborhood boundary interpolation filtering, and FIG. 10 is a diagram presenting an illustrative application of such operations. In block 902, the grid element displacements 1002A-1002I are grouped into sections 1004, with each grid element section 1004 having a plurality of grid element displacement boundaries (1002A, 1002B, 1002C; 1002C, 1002F, 1002I; 1002I, 1002H, 1002G; and 1002G, 1002D, 1002A) including grid element displacement corners 1002A, 1002C, 1002I, and 1002G. In block 904, for each grid element displacement boundary 1002A, 1002B, 1002C; 1002C, 1002F, 1002I; 1002I, 1002H, 1002G; and 1002G, 1002D, 1002A of each grid element displacement section 1004, the grid element displacement 1002B between the grid element displacement corners is modified with interpolated grid element displacements. For example, the grid displacement value of grid element 1002B is replaced by a grid displacement value interpolated from grid displacement value 1002A (+2) and 1002C (+8) which is +5. Similar operations are performed for the remaining grid displacement boundaries 1002C, 1002F, 1002I; 1002I, 1002H, 1002G; and 1002G, 1002D, 1002A, also as shown in FIG. 10.

Returning to FIG. 3, once the grid elements have been neighbor displacement filtered, they are applied to a minimum mean squared error (MMSE) filter, as shown in blocks 314H and 314V. The MMSE filter takes any grid element displacements which are near the extreme values (e.g. a threshold number of standard deviations away from a mean grid displacement value) in either direction and labels their values as invalid. This enables processing later on which can replace their values with estimated displacements that roughly match the overall frame displacement surface.

Figure 11:
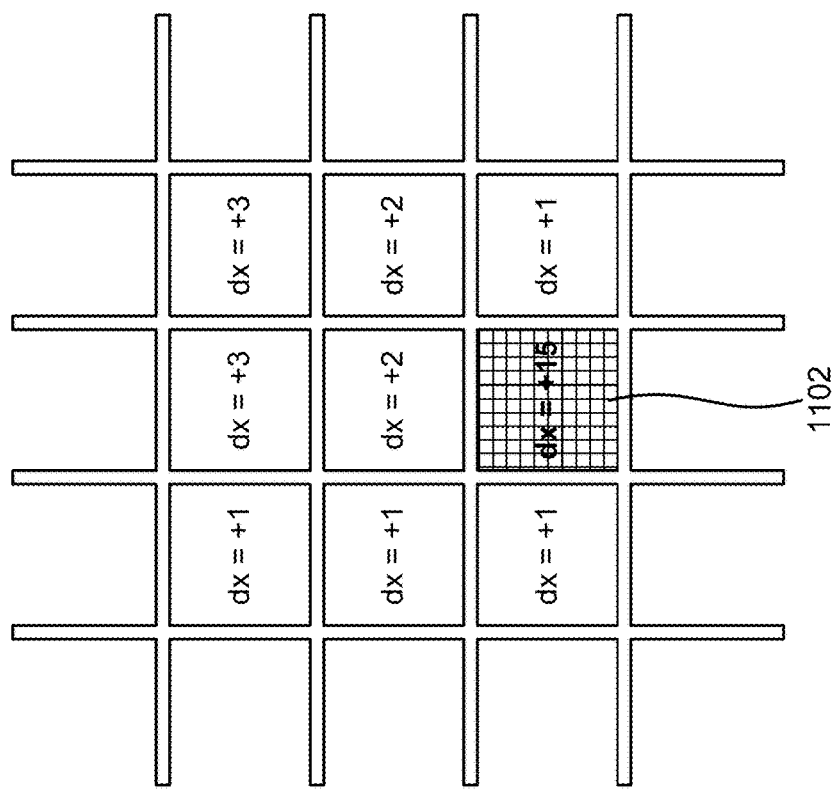
FIG. 11 is a diagram depicting the identification of a grid element having a displacement much greater than those in the remaining grid elements.

FIG. 11 is a diagram depicting the identification of a grid element having a displacement much greater than those in the remaining grid elements. In this illustration, grid element 1102 has a displacement of +15, which is much larger than the largest of the remaining grid displacements (+3). This grid element 1102 is marked as invalid for later processing, or may simply be replaced with an average of nearby elements.

Again returning to FIG. 3, a histogram displacement filter is applied to horizontal and vertical grid element displacements as illustrated in blocks 316H and 316V. The histogram displacement filter takes the displacement values in either horizontal or vertical directions and produces a contiguous set of values that represents the displacement field over the entire frame. The processing steps are described below in reference to FIG. 12.

Figure 12:
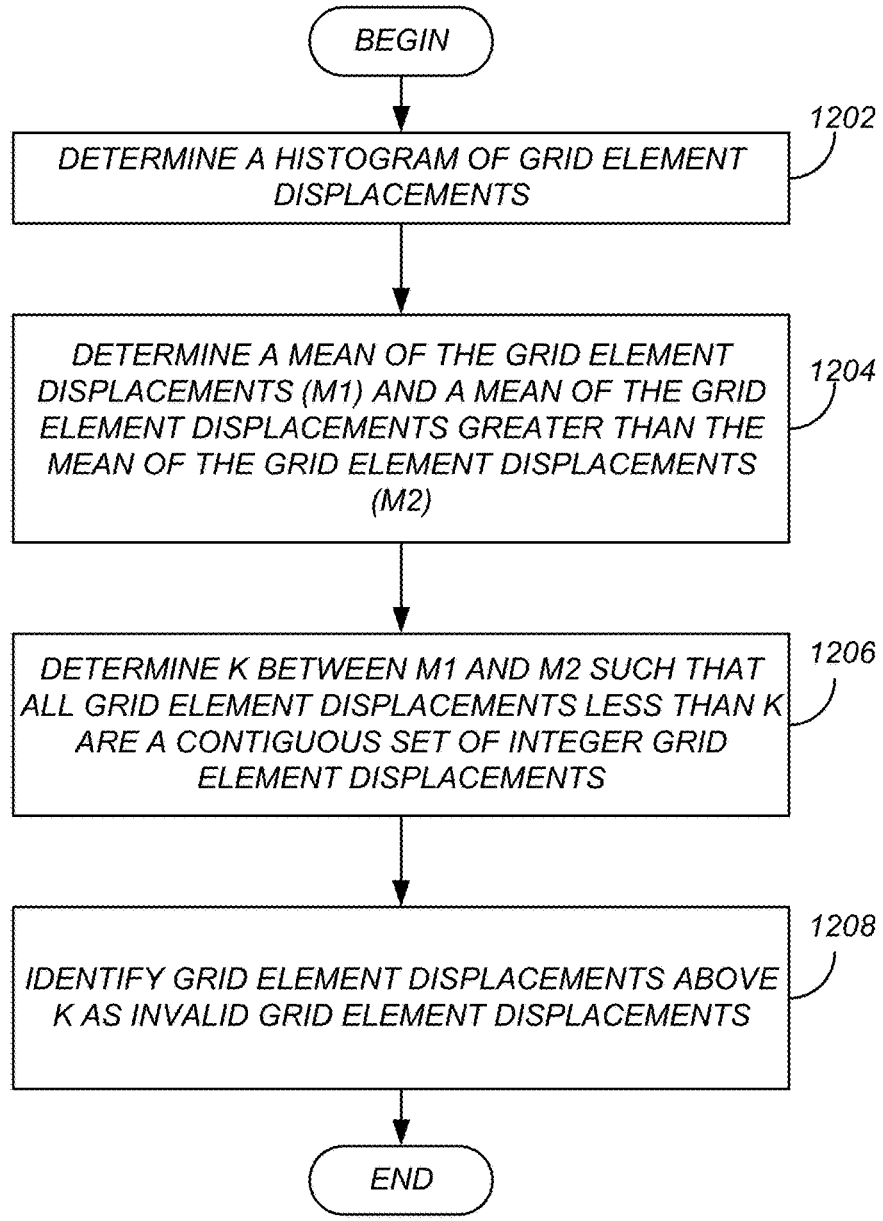
FIG. 12 is a diagram illustrating exemplary operations performed by the histogram displacement filter.
Figure 13A:
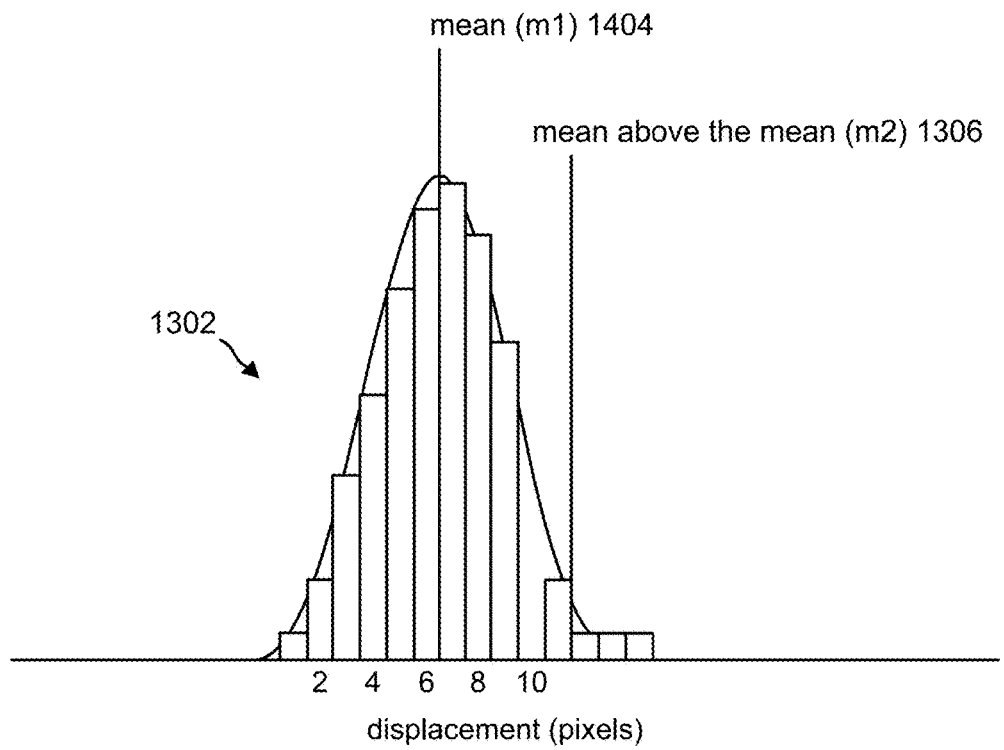
FIGS. 13A and 13B are diagrams presenting an illustrative application of such histogram displacement filtering.
Figure 13B:
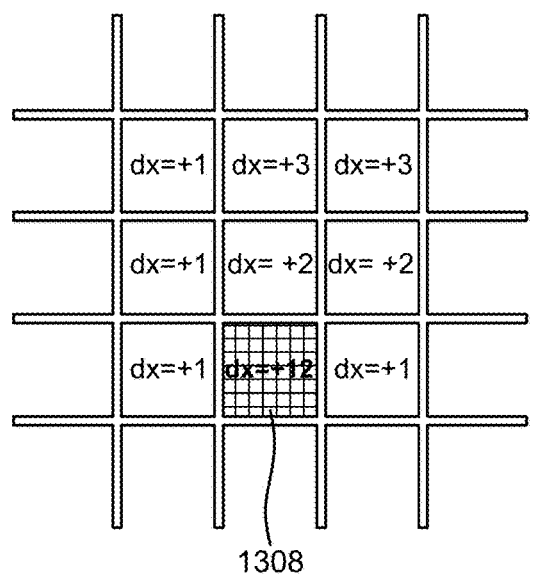

FIG. 12 is a diagram illustrating exemplary operations performed by the histogram displacement filter, and FIGS. 13A and 13B are diagrams presenting an illustrative application of such operations. In block 1202, a histogram 1302 of grid element displacements are is determined over the image frame 202. As illustrated in FIG. 13A, each column of the histogram 1302 represents a number of pixel displacements in the frame (or subset of the frame) that have a particular displacement value. In block 1204 a mean of the grid element displacements (M1) 1304 and a mean of the grid element displacements greater than the mean of the grid element displacements (M2) 1306 is determined. In block 1206 an integer K is determined between M1 1304 and M2 1306 such that all grid element displacements less than or equal to K are a contiguous set of integer grid displacements. Referring to FIG. 13A, it is seen that there is a discontiguous portion at K=10, but when K=10, all grid element displacements are contiguous. Hence, K=10 is the largest integer for which all of the grid element displacements are less than or equal to 10. Finally, in block 1208, the grid element displacements above K (in the foregoing example, K=10) are identified as invalid.

The foregoing process can be summarized as follows (1) compute a histogram of displacement values over the frame, (2) compute the mean of the histogram values (M1) and mean above the mean of the histogram values (M2), (3) let K vary over the integer values between M1 and M2, and if the histogram values above K (denoted as H1), or below K if M1 is negative, cover a contiguous set of integer displacements, exit the loop, otherwise increment K and continue, and (4) label all displacement values in this frame that are outside the set H1 as invalid.

In the foregoing, the term "mean above mean" is used as a short hand for a calculation in which if the mean is positive, the mean above mean is determined by computing the mean of all displacement values that are above the mean in value. If the mean is negative, the mean above the mean is determined by computing the mean of all values that are below the mean in value.

The foregoing process looks for contiguous displacement values away from 0 in either the positive or negative direction. If it finds a gap (no displacement values of a certain size), then it throws away values beyond the gap. For example, if it finds the displacement values [1,2,3,4,5,7,8] are present and the mean is for example 3, then it would throw away displacement values 7 and 8 and label those as invalid and would only have displacement values [1,2,3,4,5] in the image. Conversely, if it had displacement values [−1, −2, −3, −4, −5, −7, −8], it would declare −7 and −8 invalid and have only [−1, −2, −3, −4, −5] displacements.

FIG. 13B is a diagram illustrating the identification of a grid element displacement 1308as an invalid group of grid element displacements. In the illustrated example, grid element displacement 1308 is has a value of +12, and is therefore greater than the identified value of K (10). Accordingly, grid element 1308 is identified as invalid.

Referring back to FIG. 1, After the feature correspondence has been established and filtering has been performed the mapping or warping function that transforms the sensed image to overlay it over the reference one is determined, as described in block 110. Preferably, the type of warping function should correspond to the assumed geometric deformation of the sensed image, to the method of image acquisition and to the required accuracy of the registration. Models of warping functions can be divided into two broad categories: global models and local models. Global models use all feature matches for estimating one warping function for the entire image. Local models treat the image as a composition of patches and the function parameters depend on data in each patch. This leads to a set of warping functions for each patch separately.

The process described below fits to a warping transform defined by a collection of two dimensional surfaces, one for each part of an "overgrid." The overall warping transform is then the total surface defined by all these surfaces joined together into a single transform. A baseline implementation uses l1 norms to fit the displacement data to a linear function (i.e. a plane) in two dimensions because it has a simple direct implementation using linear programming. This fit uses the l1 norm as the distance measure because this allows the fitting routine to throw out bad displacement data more effectively than using the typical l2 norm. The l1 norm is also known as least absolute deviations (LAD), least absolute errors (LAE), and is generated by minimizing the sum of the absolute differences (S) between the target value ($y_i$) and the estimated values $f(x_i)$: $S=\Sigma_{i=1}^{n}|y_i-f(x_i)|$. The l2 norm is also known as the least squares norm, and is generated by minimizing the sum of the square of the absolute differences S between the target value ($y_i$) and the estimated values $f(x_i)$: $S=\Sigma_{i=1}^{n}(y_i-f(x_i))^2$.

Figure 14:
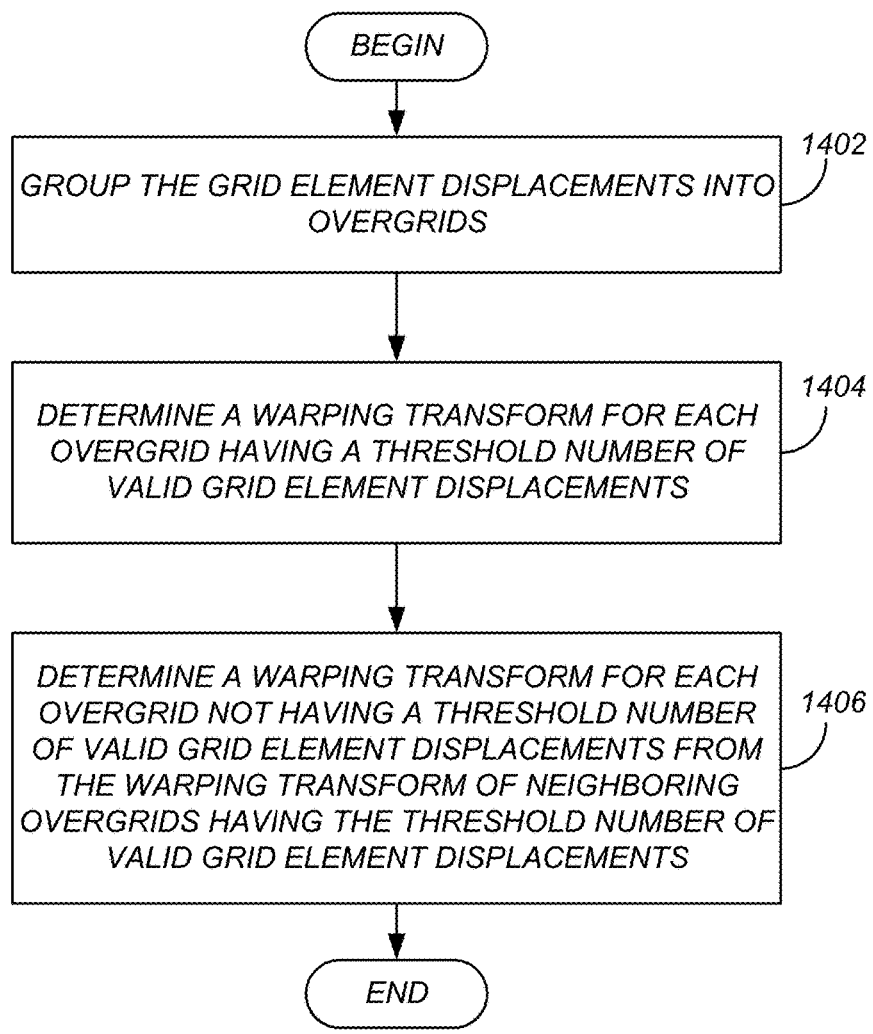
FIG. 14 is a diagram presenting exemplary operations for defining a warping function or transform.

FIG. 14 is a diagram presenting exemplary operations for defining a warping function or transform. In block 1402, the grid element displacements are grouped into an overgrid.

Figure 15:
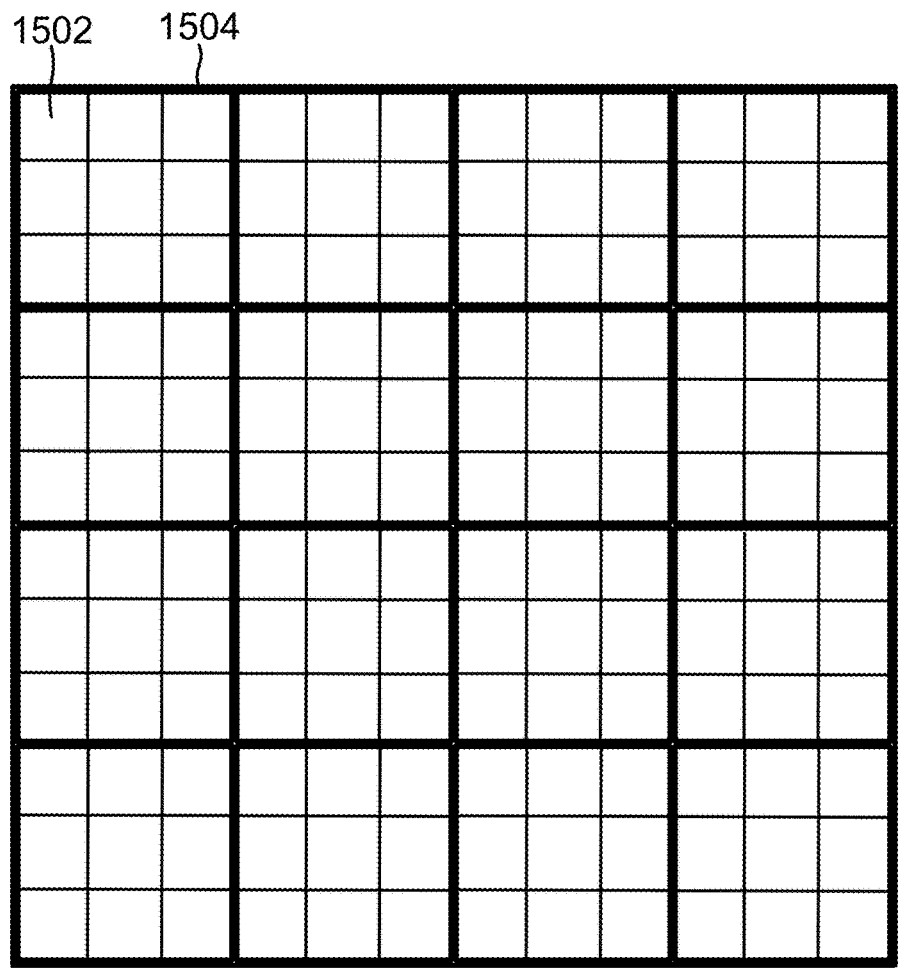
FIG. 15 is a diagram illustrating a plurality of grid elements, each having a plurality of pixel displacements, grouped into a plurality of overgrid elements.

FIG. 15 is a diagram illustrating an exemplary embodiment of a plurality of grid elements 1502, each having a plurality of pixel displacements, grouped into a plurality of overgrid elements 1504. Each overgrid 1504 includes 9 grid elements 1502. Next, a warping transformation is determined for each overgrid element 1504 having a threshold number of valid grid element displacements, as shown in block 1404. Then, at block 1406, a warping transform is determined for each overgrid 1504 not having the threshold number of valid grid element displacements from the warping transform of neighboring overgrids having the threshold number of valid element displacements.

Figure 16A:
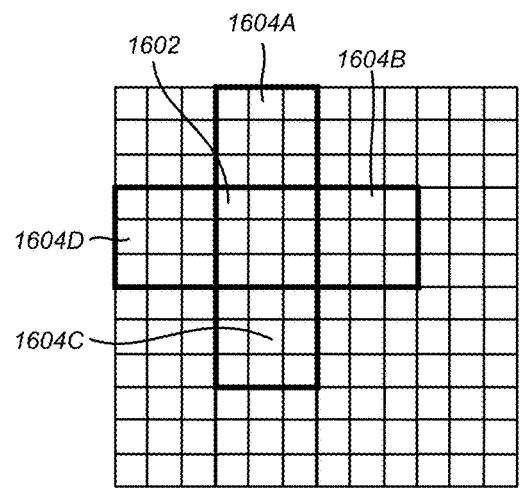
FIGS. 16A-16D are diagrams illustrating the operations for defining a warping function or transform.
Figure 16B:
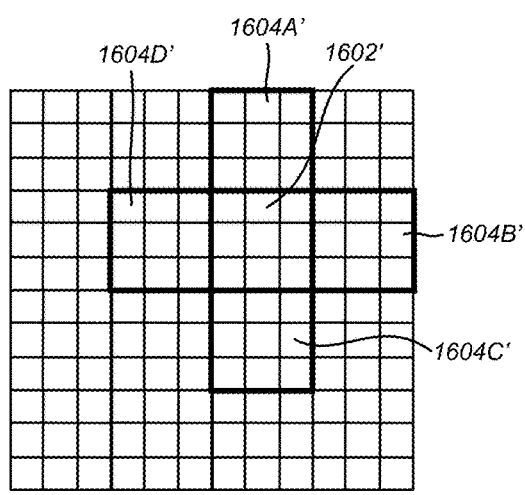
Figure 16C:
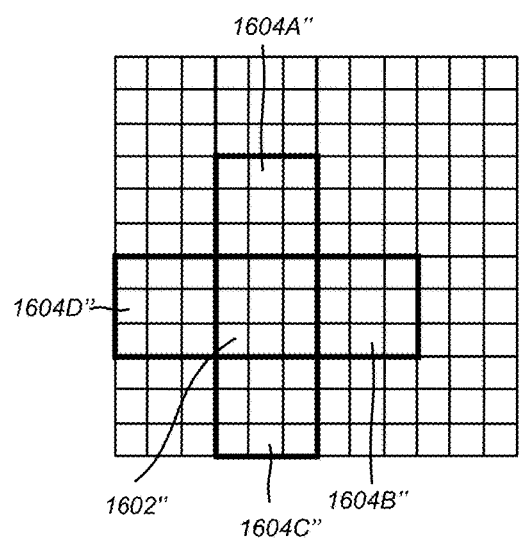
Figure 16D:
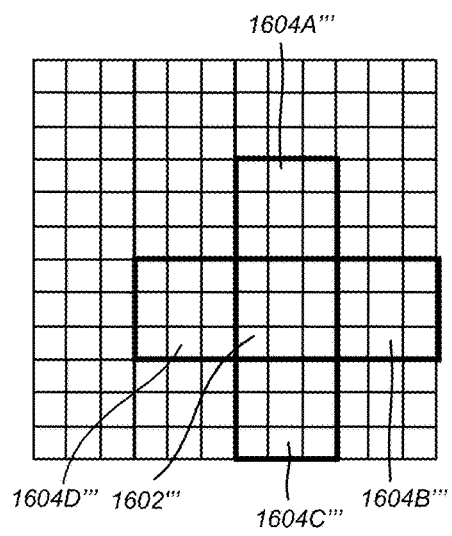

FIGS. 16A-16D are diagrams illustrating the operations described in FIG. 14. For example, each overgrid element (for example, overgrid element 1602 of FIG. 16A) is examined and if there are enough valid displacement values in it (this threshold may be set based on the number of grid elements 1502 in overgrid element 1602), a linear function is fitted to this displacement data (see the explanation below in the next paragraph) and the overgrid element 1602 is declared valid. Otherwise it is counted as invalid and the number of valid neighboring overgrid elements 1604A-1604D are computed. This would be 0, 1, 2, 3, or 4 in value since only horizontal/vertical neighbors are counted. Next all the invalid neighboring overgrid elements 1604-1604D are examined, in the order of the neighboring overgrid elements that have 4 valid neighboring overgrid elements, ones that have 3 valid neighboring overgrid elements, ones that have 2 valid neighboring overgrid elements, and ones that have 1 valid neighboring overgrid elements. Since these are updated and declared valid as processing proceeds through this list, there is no case where there would be zero valid neighboring overgrid elements 1604A-1604D, since any valid neighboring overgrid element 1605A-1604D would touch others (if no valid overgrid elements are available on the entire image, the image registration fails for that frame and processing continues to the next frame). When processing a specific invalid overgrid element 1602 with a number of valid neighboring overgrid elements 1604A-1604D, we proceed we replace the displacements on the neighboring overgrid elements 1604A-1604D next to the valid neighbor overgrid elements with the fitted values from the valid neighboring overgrids elements 1604A-1604D. Then all the valid grid displacements in the current overgrid element 1602 are fit with a linear function. In the end, the entire frame has linear functions for every overgrid element 1504 defined. FIGS. 16B-16C illustrate the foregoing process for different overgrid elements 1602'-1602''' and related neighboring overgrid elements 1604A'-1604C'''.

In one embodiment of fitting to a linear function or plane, the implementation uses linear programming techniques to solve the curve fitting directly. Consider the general $l_1$ linear fitting problem as follows. Let A be an M×N matrix with full rank. Given $y \in R^M$, the $l_1$ minimization problem $$\min_x \|y - Ax\|_1$$

finds the vector $x \in R^N$ such that the error y−Ax has a minimum $l_1$ norm, with the $l_1$ norm of a vector is defined as $$\|z\|_1 = \Sigma_{i=1}^M |z_i|$$

This ensures that the difference between Ax and y will be sparse. For our purposes, this sparsity allows errors causes by isolated misleading pixel displacements to be ignored. The $l_1$ norm minimization problem above can be recast as the following linear program:

$$\min_{x,u} \sum_{m=1}^M u_m$$

subject to Ax−u−y≤0 and −Ax−u+y≤0. Here the M×N matrix A is required to have more rows than columns. This can be solved either with a simplex-type algorithm or interior point methods.

In the above case of a linear fit to a plane for both the horizontal and vertical displacement ($d_h$ and $d_v$) at each grid row and column ($r_i$, $c_i$) where i=1, . . . , G runs over the valid grids within the present overgrid, we set up the warping estimate as follows:

$$A_{GX3} = [r_{Gx1}, c_{Gx1}, 1_{Gx1}]$$

where the solution x is a 3×1 vector containing the plane coefficients to be estimated. One such coefficient estimate is created for each overgrid to define the entire warping transformation.

Figure 17:
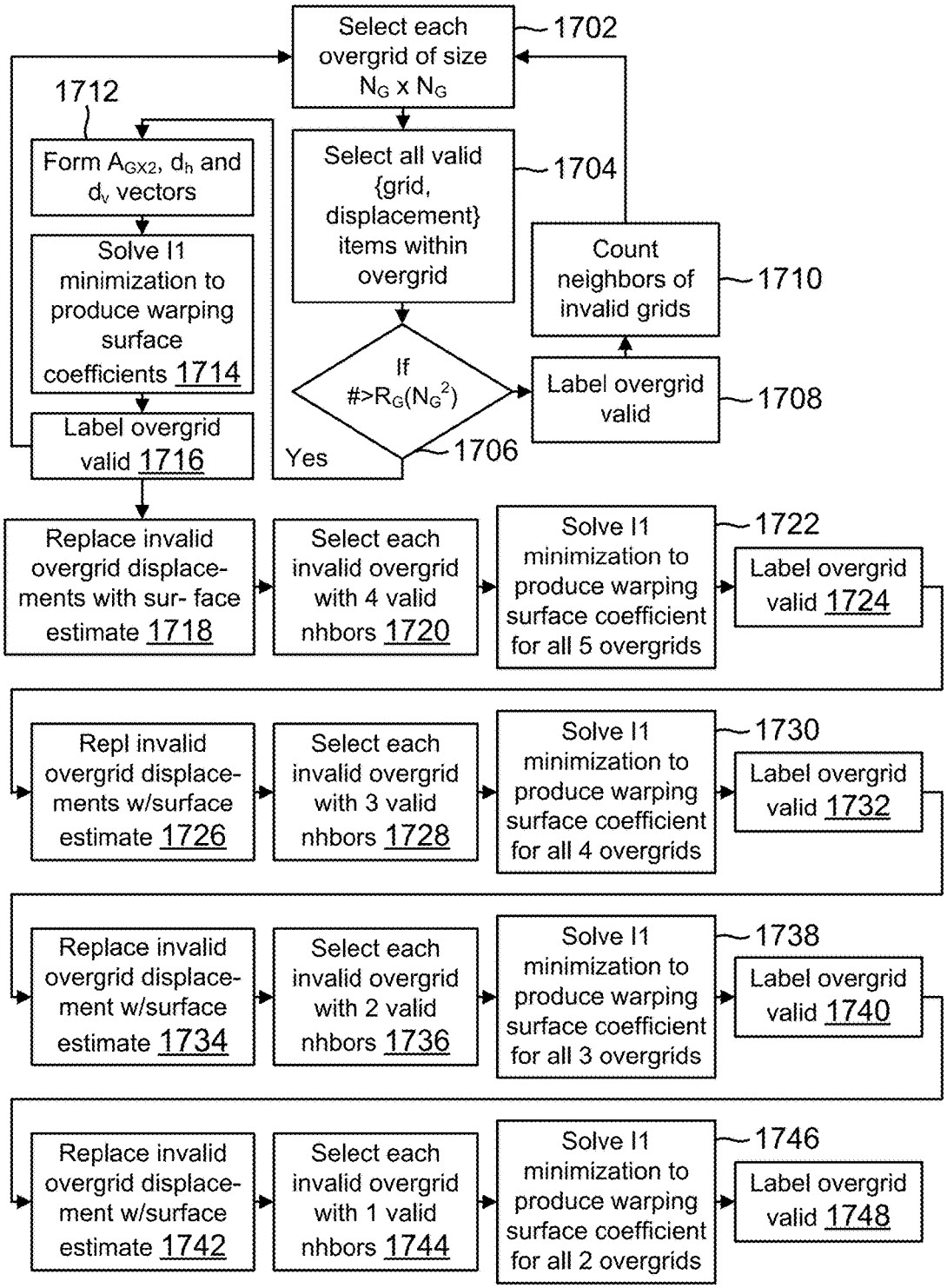
FIG. 17 is a diagram presenting exemplary operations that can be performed to define and use the warping transforms.

FIG. 17 is a diagram presenting exemplary operations that can be performed to define and use the warping transforms. In block 1702, an overgrid element 1602 of size $N_G \times N_G$ is selected. In block 1704 valid grid element displacements (grid element displacements that have not been identified as invalid) are determined. In block 1706, the number of invalid grid element displacements (#) is compared to a threshold $R_G(N_G^2)$ which is a set of integer thresholds between 0 and $N_G^2$ that depend on the number of elements in an overgrid $N_G^2$ that are chosen through experimentation by the designer for his particular image domain. If there are too many invalid grid elements, the overgrid element under consideration 1602 is labeled invalid, as shown in block 1708. Processing is then routed to block 1710, which considers overgrid elements 1604A-1604D neighboring the overgrid element under consideration 1602, and the process is completed until an overgrid element having a sufficient number of valid grid element displacements is found, this passing processing to block 1712.

Block 1712 forms the $A_{GX3}$ and $d_h$ and $d_v$ vectors as described above. In block 1714, the $l_1$ minimization problem is solved as described above to produce warping surface coefficients. In block 1716, the overgrid element 1602 under consideration is labeled as valid, and if all of the overgrid elements of the frame have not been considered, processing is routed to block 1702 to perform the operations of blocks 1702-1714 for another of the overgrid elements (e.g. 1602', 1602" or 1602'''). Once all of the overgrid elements have either been found to have too many invalid grid displacement elements or has been found to have enough valid displacement elements and a warping surface coefficient has been computed (e.g. by blocks 1712 and 1714), processing is routed to blocks 1718-1748. Block 1718 replaces the grid element displacements of the valid overgrid elements with the surface estimate. Block 1720 selects each invalid overgrid element (e.g. 1602) having 4 valid neighboring overgrid elements (e.g. 1604A-1604D), and block 1722 solves the $l_1$ minimization to produce warping surface coefficients for all 5 overgrid elements (the invalid overgrid element and the 4 valid neighboring overgrid elements). The overgrid element under consideration is then labeled as valid, and processing is routed to block 1726, which replaces invalid overgrid elements with a surface estimate, including the overgrid elements labeled valid in block 1724. Block 1728 then selects each invalid overgrid with 3 valid neighboring overgrid elements, and block 1730 solves the $l_1$ minimization to produce warping surface coefficients for the 4 overgrids (the overgrid under consideration and the 3 neighboring overgrids). Block 1732 labels the overgrid under consideration as valid, and block 1734 replaces invalid overgrid displacements (including the overgrid labeled as valid in block 1732) with a surface estimate. This process is repeated in blocks 1736-1748 for cases where the overgrid element under consideration has only 2 valid neighbors and 1 valid neighbor.

Figure 18:
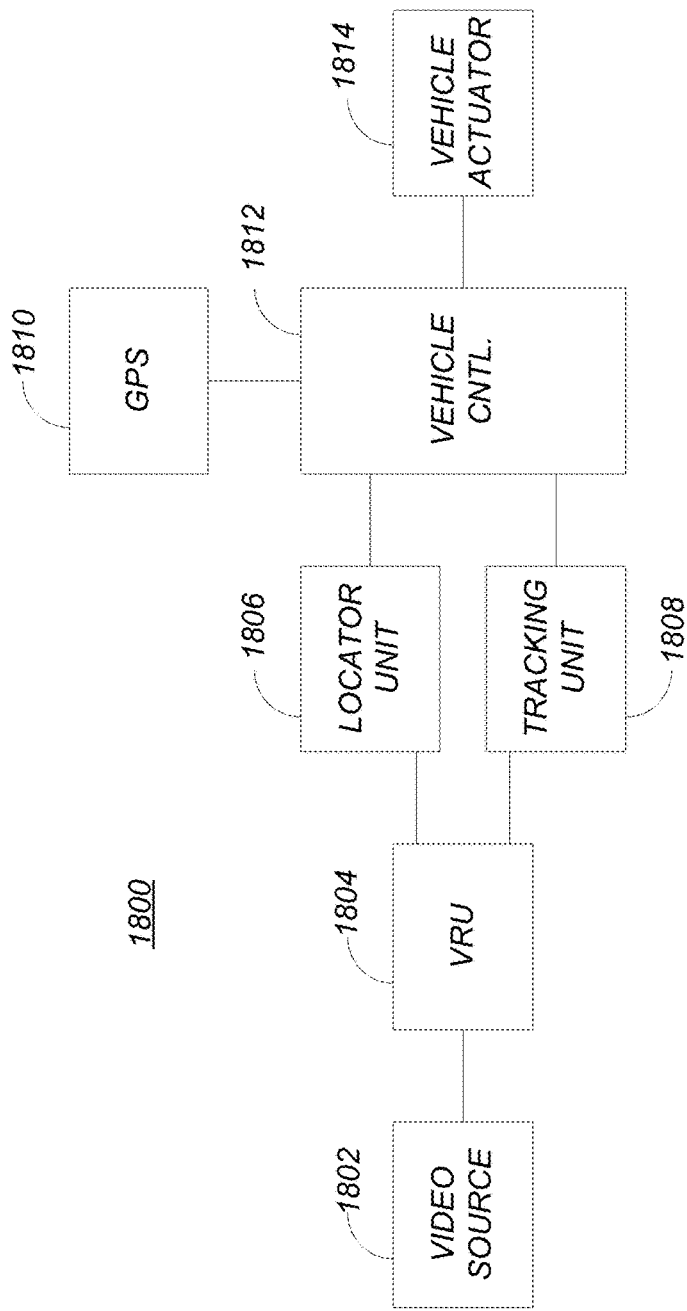
FIG. 18 is a diagram depicting one embodiment of an exemplary application of the vehicle registration system, specifically a vehicle guidance system.

FIG. 18 is a diagram depicting one embodiment of an exemplary application of the vehicle registration system, specifically a vehicle guidance system 1800. The vehicle guidance system 1800 comprises a video source 1802 communicatively coupled to a video registration unit 1804. The video source 1802 generates successive image frames.

The video registration unit 1804 receives image frames from the video source 1802 and performs background image registration based on those image frames. A typical video image includes image of different objects, all moving at different rates. The video image typically also includes a background image, which also appears to move because of motion of the video source 1802. The video registration unit (VRU) performs background registration of the images from the video source 1802, thus identifying and correlating the background image. Once the background has been registered an image may be compared to a previous image to identify differences. Such differences between succeeding images represent motion of the objects in the image, and not the relative motion (lateral or angular) of the video source.

The video registration unit 1804 provides information about sensed objects to a locator unit 1806 and a tracking unit 1808. Once the motion of non-background objects in the image are identified, this information is provided to the locator unit 1806 which computes the location of the vehicle, and the tracking unit 1808, which tracks objects within the view of the video source 1802. The vehicle location and tracked object information is provided to a vehicle control system 1812, which computes vehicle guidance commands from the information provided by the locator unit 1806 and the tracking unit 1808, as well as global location information, which can be obtained, for example, by a global positioning system (GPS) receiver 1810. The resulting guidance commands are provided to one or more vehicle actuators 1814, which guide the vehicle on the desired path. The vehicle itself may comprise an aircraft, spacecraft, or terrestrially based vehicle.

Hardware Environment

Figure 19:
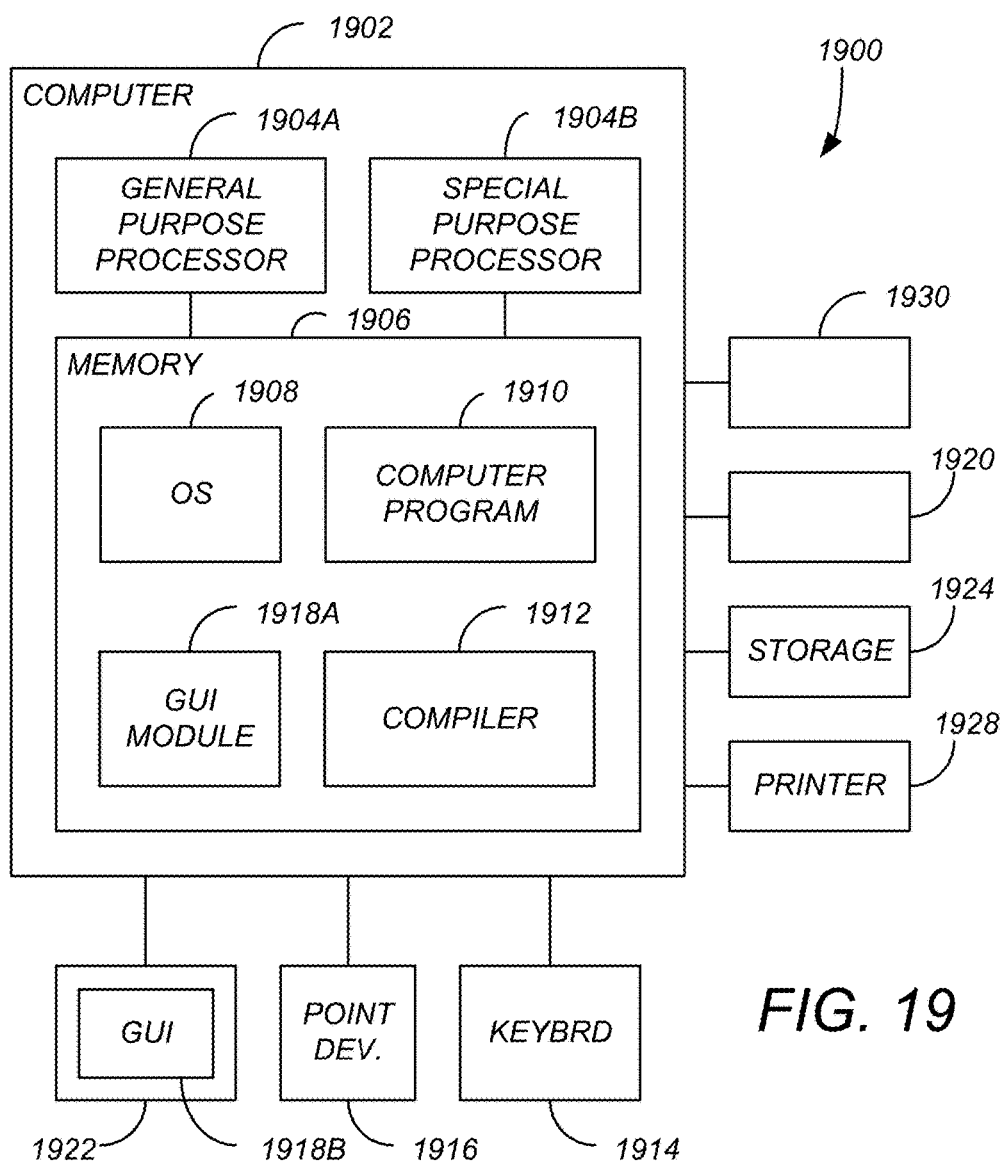
FIG. 19 illustrates an exemplary computer system 1900 that could be used to implement processing elements.

FIG. 19 illustrates an exemplary computer system 1900 that could be used to implement processing elements of the above disclosure, including the VRU 1804, locator unit 1806, tracking unit 1808, vehicle control system 1812, or elements of the video source 1802 and GPS 1810. The computer 1902 comprises general purpose processor 1904A, special purpose processor 1904B and a memory, such as random access memory (RAM) 1906. The computer 1902 is operatively coupled to a display 1922, which presents images such as windows to the user on a graphical user interface 1918B. The computer 1902 may be coupled to other devices, such as a keyboard 1914, a mouse device 1916, a printer, etc. Of course, those skilled in the art will recognize that any combination of the above components, or any number of different components, peripherals, and other devices, may be used with the computer 1902.

Generally, the computer 1902 operates under control of an operating system 1908 stored in the memory 1906, and interfaces with the user to accept inputs and commands and to present results through a graphical user interface (GUI) module 1918A. Although the GUI module 1918B is depicted as a separate module, the instructions performing the GUI functions can be resident or distributed in the operating system 1908, the computer program 1910, or implemented with special purpose memory and processors. The computer 1902 also implements a compiler 1912 which allows an application program 1910 written in a programming language such as COBOL, C++, FORTRAN, or other language to be translated into processor 1904 readable code. After completion, the application 1910 accesses and manipulates data stored in the memory 1906 of the computer 1902 using the relationships and logic that was generated using the compiler 1912. The computer 1902 also optionally comprises an external communication device such as a modem, satellite link, Ethernet card, or other device for communicating with other computers, and may be communicatively coupled to a printer 1928.

In one embodiment, instructions implementing the operating system 1908, the computer program 1910, and the compiler 1912 are tangibly embodied in a computer-readable medium, e.g., data storage device 1920, which could include one or more fixed or removable data storage devices, such as a zip drive, floppy disc drive 1924, hard drive, CD-ROM drive, tape drive, etc. Further, the operating system 1908 and the computer program 1910 are comprised of instructions which, when read and executed by the computer 1902, causes the computer 1902 to perform the operations herein described. Computer program 1910 and/or operating instructions may also be tangibly embodied in memory 1906 and/or data communications devices 1930, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used. For example, while the foregoing has been described in terms of a second image temporally subsequent from the first image, the techniques described above apply to images reflecting a different perspective at the same moment in time, obtained using a different sensor or sensor type, or any combination thereof.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of registering a first image having a first plurality of pixel values and a second image having a second plurality of pixel values, comprising:
    selecting the first image having the first plurality of pixel values and the second image having the second plurality of pixel values and spatially corresponding to the first image;
    grouping the first plurality of pixel values according to a grid having a plurality of grid elements, each grid element having a plurality of grid element pixels;
    determining a grid element displacement of the second image from the first image for each grid element to produce a plurality of grid element displacements;
    filtering the plurality of grid element displacements of the second image from the first image to produce a plurality of filtered valid grid element displacements and invalid grid element displacements;
    determining a warping transform of each of the plurality of grid element displacements, comprising:
        grouping the plurality of grid element displacements into a plurality of overgrids;
        determining a first plurality of warping transforms, each of the first plurality of warping transforms determined for an associated one of overgrids having a threshold number of filtered valid grid element displacements; and
        determining a second plurality of warping transforms, each of the second plurality of warping transforms determined for an associated one of overgrids not having the threshold number of filtered valid grid element displacements from one or more of the first plurality of warping transforms of neighboring overgrids having the threshold number of filtered valid grid element displacements;

wherein the first plurality of pixel values and the second plurality of pixel values are from one or more image sensors, each of the one or more image sensors having a plurality of pixels.

2. The method of claim 1, wherein filtering the plurality of grid element displacements of the second image from the first image to produce the plurality of filtered valid grid element displacements and invalid grid element displacements comprises:

mode-P filtering at least a portion of the plurality of grid element displacements.

3. The method of claim 2, wherein mode-P filtering at least the portion of the grid element displacements comprises:

identifying a present grid element displacement to be filtered;

identifying neighboring grid element displacements adjacent to the present grid element;

determining a largest integer number N of the neighboring grid element displacements having a same displacement value; and modifying a displacement value of the present grid element to the same displacement value if N is greater than or equal to an integer number P.

4. The method of claim 3, wherein the neighboring grid element displacements comprise 8 grid elements surrounding the present grid element, and P=5.

5. The method of claim 1, wherein filtering the plurality of grid element displacements of the second image from the first image to produce the plurality of filtered valid grid element displacements and invalid grid element displacements comprises:

neighbor boundary interpolating at least a portion of the plurality of grid element displacements.

6. The method of claim 5, wherein neighbor boundary interpolating at least the portion of the plurality of grid element displacements comprises:

grouping the plurality of grid element displacements into sections, each grid element displacement section having a plurality of grid element displacement boundaries, the plurality grid element displacement boundaries including grid element displacement corners;

for each grid element displacement boundary of each grid element displacement section, modifying the grid element displacements between the grid element displacement corners with interpolated grid element displacements.

7. The method of claim 1, wherein filtering the plurality of grid element displacements of the second image from the first image to produce the plurality of filtered valid grid element displacements and invalid grid element displacements comprises:

identifying grid element displacements within a threshold number of displacements from a maximum displacement or a minimum displacement as the invalid grid element displacements.

8. The method of claim 1, wherein filtering the plurality of grid element displacements of the second image from the first image to produce the plurality of filtered valid grid element displacements and invalid grid element displacements comprises:

determining a histogram of the plurality of grid element displacements;

determining a first mean of the plurality of grid element displacements (m1) and a second mean of the plurality of grid element displacements greater than the first mean of the plurality of grid element displacements (m2);

determine an integer number K between m1 and m2 such that all of the plurality of grid element displacements less than K are a contiguous set of integer grid element displacements; and identifying grid element displacements above K as invalid grid element displacements.

9. An apparatus for registering a first image having a first plurality of pixel values and a second image having a second plurality of pixel values, comprising:

a processor;

a memory, communicatively coupled to the processor, the memory storing instructions including instructions for:

selecting the first image having the first plurality of pixel values and the second image having the second plurality of pixel values and spatially corresponding to the first image;

grouping the first plurality of pixel values according to a grid having a plurality of grid elements, each grid element having a plurality of grid element pixels;

determining a grid element displacement of the second image from the first image for each grid element to produce a plurality of grid element displacements;

filtering the plurality of grid element displacements of the second image from the first image to produce a plurality of filtered valid grid element displacements and invalid grid element displacements;

determining a warping transform of each of the plurality of grid element displacements, comprising:

grouping the plurality of grid element displacements into a plurality of overgrids;

determining a first plurality of warping transforms, each of the first plurality of warping transforms determined for an associated one of overgrids having a threshold number of filtered valid grid element displacements; and determining a second plurality of warping transforms transform, each of the second plurality of warping transforms determined for an associated one of overgrids not having the threshold number of filtered valid grid element displacements from one or more of the first plurality of warping transforms of neighboring overgrids having the threshold number of filtered valid grid element displacements;

wherein the first plurality of pixel values and the second plurality of pixel values are from one or more image sensors, each of the one or more image sensors having a plurality of pixels.

10. The apparatus of claim 9, wherein the instructions for filtering the plurality of grid element displacements of the second image from the first image to produce the plurality of filtered valid grid element displacements and invalid grid element displacements instructions for:

mode-P filtering at least a portion of the plurality of grid element displacements.

11. The apparatus of claim 10, wherein the instructions for mode-P filtering at least the portion of the grid element displacements comprises:

identifying a present grid element displacement to be filtered;

identifying neighboring grid element displacements adjacent to the present grid element;

determining a largest integer number N of the neighboring grid element displacements having a same displacement value; and modifying a displacement value of the present grid element to the same displacement value if N is greater than or equal to an integer number P.

12. The apparatus of claim 11, wherein the neighboring grid element displacements comprise 8 grid elements surrounding the present grid element, and P=5.

13. The apparatus of claim 9, wherein the instructions for filtering the plurality of grid element displacements of the second image from the first image to produce the plurality of filtered valid grid element displacements and invalid grid element displacements comprise instructions for:

neighbor boundary interpolating at least a portion of the grid element displacements.

14. The apparatus of claim 13, wherein the instructions for neighbor boundary interpolating at least the portion of the plurality of grid element displacements comprises instructions for:

grouping the plurality of grid element displacements into sections, each grid element displacement section having a plurality of grid element displacement boundaries, the plurality of grid element displacement boundaries including grid element displacement corners;

for each grid element displacement boundary of each grid element displacement section, modifying the grid element displacements between the grid element displacement corners with interpolated grid element displacements.

15. The apparatus of claim 9, wherein the instructions for filtering the plurality of grid element displacements of the second image from the first image to produce the plurality of filtered valid grid element displacements and invalid grid element displacements comprise instructions for:

identifying grid element displacements within a threshold number of displacements from a maximum displacement or a minimum displacement as the invalid grid element displacements.

16. The apparatus of claim 9, wherein the instructions for filtering the plurality of grid element displacements of the second image from the first image to produce the plurality of filtered valid grid element displacements and invalid grid element displacements comprise instructions for:

determining a histogram of the plurality of grid element displacements;

determining a first mean of the plurality of grid element displacements (m1) and a second mean of the plurality of grid element displacements greater than the first mean of the plurality of grid element displacements (m2);

determine an integer number K between m1 and m2 such that all of the plurality of grid element displacements less than K are a contiguous set of integer grid element displacements; and identifying grid element displacements above K as invalid grid element displacements.

17. A vehicle guidance system, comprising:

a video source, having a plurality of pixels, the video source for producing a first image having a first plurality of pixel values and a second image having a second plurality of pixel values;

a registration unit, communicatively coupled to the video source, the registration unit for registering the first image and the second image, the registration unit comprising:

a processor;

a memory, communicatively coupled to the processor, the memory storing instructions including instructions for:

selecting the first image having the first plurality of pixel values and the second image having the second plurality of pixel values and spatially corresponding to the first image;

grouping the first plurality of pixel values according to a grid having a plurality of grid elements, each grid element having a plurality of grid element pixels;

determining a grid element displacement of the second image from the first image for each grid element to produce a plurality of grid element displacements;

filtering the plurality of grid element displacements of the second image from the first image to produce a plurality of filtered valid grid element displacements and invalid grid element displacements;

determining a warping transform of each of the plurality of grid element displacements, comprising:

grouping the plurality of grid element displacements into a plurality of overgrids;

determining a first plurality of warping transforms, each of the first plurality of warping transforms determined for an associated one of overgrids having a threshold number of filtered valid grid element displacements; and determining a second plurality of warping transforms, each of the second plurality of warping transforms determined for an associated one of overgrids not having the threshold number of filtered valid grid element displacements from one or more of the first plurality of warping transforms of neighboring overgrids having the threshold number of filtered valid grid element displacements.

18. The vehicle guidance system of claim 17, wherein the instructions for filtering the plurality of grid element displacements of the second image from the first image to produce the plurality of filtered valid grid element displacements and invalid grid element displacements comprises:

mode-P filtering at least a portion of the plurality of grid element displacements.

19. The vehicle guidance system of claim 18, wherein the instructions for mode-P filtering at least the portion of the grid element displacements comprise instructions for:

identifying a present grid element displacement to be filtered;

identifying neighboring grid element displacements adjacent to the present grid element;

determining a largest integer number N of the neighboring grid element displacements having a same displacement value; and modifying a displacement value of the present grid element to the same displacement value if N is greater than or equal to an integer number P.

20. The vehicle guidance system of claim 19, wherein the neighboring grid element displacements comprise 8 grid elements surrounding the present grid element, and P=5.

* * * * *